US007013467B1

(12) United States Patent
McLain, Jr. et al.

(10) Patent No.: US 7,013,467 B1
(45) Date of Patent: *Mar. 14, 2006

(54) SYSTEM AND METHOD FOR MANAGING COMPUTER SYSTEM RESOURCES USING COMMAND CONTROL VECTORS

(75) Inventors: John V. McLain, Jr., Colorado Springs, CO (US); Damon Curnell, Colorado Springs, CO (US)

(73) Assignee: MCI Communications Corporation, Washington, DC (US)

(*) Notice: Subject to any disclaimer, the term of this patent is extended or adjusted under 35 U.S.C. 154(b) by 0 days.

This patent is subject to a terminal disclaimer.

(21) Appl. No.: 08/987,849

(22) Filed: Dec. 9, 1997

(51) Int. Cl.
*G06F 9/00* (2006.01)

(52) U.S. Cl. .................................................. 719/320
(58) Field of Classification Search ................. 709/318, 709/313, 315, 107, 108; 719/320, 315, 316, 719/313, 310; 718/107, 108, 102; 717/139
See application file for complete search history.

(56) References Cited

U.S. PATENT DOCUMENTS

| 4,455,602 | A | 6/1984 | Baxter, III et al. | ......... 364/200 |
| 4,575,797 | A | 3/1986 | Gruner et al. | .............. 364/200 |
| 4,636,968 | A | 1/1987 | Gotou et al. | ................ 364/300 |
| 4,799,251 | A | 1/1989 | Smith et al. | .................... 379/1 |
| 4,924,493 | A | 5/1990 | Dang et al. | ................... 379/94 |

(Continued)

OTHER PUBLICATIONS

A. Yau. "An Object–Oriented Approach to Software Design for Distributed Real–Time Computing Systems", IEEE, 1993, pp. 297–303.*
E. Gamma, Design Patterns Elements of Reusable Object–Oriented Software, pp. 127–134.*
K. Maruyama, et al "A Concurrent Object–Oriented Switching Program in Chill", IEEE, Jan. 1991, pp. 60–68.*
H, Carr, et al "Compiling Distributed C + +", IEEE, 1993, pp. 496–503.*

*Primary Examiner*—Sue Lao

(57) ABSTRACT

A system, method and computer program product for processing multiple tasks using a single copy of a data object employs command control vectors (CCVs) for representing tasks. A CCV includes pointers to method objects that store instructions for processing tasks and pointers to data objects that store temporary data generated by execution of the method objects. A command response manager manages a queue of CCVs. A separate CCV is generated for each session thread. Multiple CCVs can point to the same method object so that only a single copy of a method object needs to be provided. In one embodiment, CCVs are used in a telecommunication network emulator, where each CCV points to a command response table method object that includes a variety of responses for a variety of inputs. When a CCV points to a script invocation within a command response table, the CCV includes a field for pointing to the invoked script, a field for pointing to a particular offset within the script and a field for pointing to a data object that stores data associated with execution of the script for the CCV. The temporary data object and the virtual instructions of the script form a virtual data object.

11 Claims, 16 Drawing Sheets

Virtual Objects

U.S. PATENT DOCUMENTS

| | | | |
|---|---|---|---|
| 5,005,197 A | 4/1991 | Parsons et al. | 379/21 |
| 5,008,812 A | 4/1991 | Bhandarkar et al. | 364/200 |
| 5,027,343 A | 6/1991 | Chan et al. | 370/17 |
| 5,157,005 A | 10/1992 | Suppiah | 371/20.1 |
| 5,170,362 A | 12/1992 | Greenberg et al. | 366/550 |
| 5,197,127 A | 3/1993 | Waclawsky et al. | 395/200 |
| 5,226,041 A | 7/1993 | Waclawsky et al. | 370/60 |
| 5,276,440 A | 1/1994 | Jolissaint et al. | 340/825.02 |
| 5,280,481 A | 1/1994 | Chang et al. | 370/85.13 |
| 5,285,494 A | 2/1994 | Sprecher et al. | 379/59 |
| 5,323,388 A | 6/1994 | Chang et al. | 370/60 |
| 5,335,268 A | 8/1994 | Kelly, Jr. et al. | 379/112 |
| 5,337,306 A | 8/1994 | Hall | 370/13 |
| 5,343,461 A | 8/1994 | Barton et al. | 370/13 |
| 5,373,501 A | 12/1994 | Roland | 370/13 |
| 5,375,126 A | 12/1994 | Wallace | 371/20.1 |
| 5,375,159 A | 12/1994 | Williams | 379/23 |
| 5,384,822 A | 1/1995 | Brown et al. | 379/10 |
| 5,394,540 A | 2/1995 | Barrington et al. | 395/500 |
| 5,396,616 A | 3/1995 | Venable | 395/500 |
| 5,410,586 A | 4/1995 | Davies | 379/14 |
| 5,414,858 A | 5/1995 | Hoffman et al. | 395/723 |
| 5,435,003 A | 7/1995 | Chng et al. | 395/575 |
| 5,444,693 A | 8/1995 | Arslan et al. | 370/34 |
| 5,475,732 A | 12/1995 | Pester, III | 379/34 |
| 5,488,648 A | 1/1996 | Womble | 375/13 |
| 5,490,272 A | 2/1996 | Mathis et al. | 395/650 |
| 5,513,345 A | 4/1996 | Sato et al. | 395/182.02 |
| 5,551,035 A * | 8/1996 | Arnold et al. | 395/650 |
| 5,557,795 A | 9/1996 | Venable | 395/650 |
| 5,563,930 A | 10/1996 | Pester, III | 379/34 |
| 5,594,792 A | 1/1997 | Chouraki et al. | 379/252 |
| 5,600,632 A | 2/1997 | Schulman | 370/252 |
| 5,636,345 A | 6/1997 | Valdevit | 395/200.11 |
| 5,652,888 A * | 7/1997 | Burgess | 395/683 |
| 6,256,659 B1 * | 7/2001 | McLain, Jr. et al. | 709/100 |
| 6,295,518 B1 * | 9/2001 | McLain et al. | 703/23 |
| 6,427,231 B1 * | 7/2002 | Burke et al. | 717/116 |

* cited by examiner

Simulated Multitasking

Polling Network Interface

Checking Database Queue

CCV Management

Virtual Objects

Table 1

| Field Name | Type | Index | Description |
|---|---|---|---|
| DevID | A1 | Y | Valid Device ID |
| DevType | A8 | N | Valid Device Types |

Table 2

| DevID | DevType |
|---|---|
| 1 | DMS250 |
| 2 | DEX |
| 3 | CTS |
| 4 | SCX |
| 5 | AXE |
| 6 | DEX600E |
| 8 | STP |
| 9 | DAO |
| A | DXC |
| B | ESF |
| C | AP |
| D | CAC |
| E | DIM |
| F | LSE |
| G | MRS |
| H | SITECN |
| J | APC |
| K | (unk) |
| N | GATEWY |
| P | PRESID |
| S | NAOM |
| T | DAOM |

Table 3: Trace Log

| Field Name | Type | Index | Description |
|---|---|---|---|
| Time | N | N | Time of event in HHMMSSSS format |
| Task | N | N | Task No. corresponding to Virtual Circuit Posting Log Message |
| Message | A80 | N | Message posted |

Table 4: Communications Log

| Field Name | Type | Index | Description |
|---|---|---|---|
| Time | N | N | Time of event in HHMMSSSS format |
| FinID | A8 | N | Finance ID of Session Logging Message |
| SessNo | A8 | N | Session No. corresponding to the Virtual Circuit Posting Log Message |
| Message | A80 | N | Message posted |

Table 5

| Field Name | Type | Index | Description |
|---|---|---|---|
| FinID | A5 | Y | Finance ID |
| DevType | A8 | Y | Generic Name of Table |
| DOSName | A8 | N | Unique DOS File Name |

Database Tables for Configuration Database 226

FIG. 12

Main Window
(c)MCI 1992               Realnet          332288 \ 15:00:14              V1.00c

| V-C # | Fin-Id | Dev-Type | V-C # | Fin-Id | Dev-Type | V-C # | Fin-Id | Dev-Type |
|-------|--------|----------|-------|--------|----------|-------|--------|----------|
| 001 1 | ATL2   | DEX600E  | 021 1 | ATL2   | DEX600E  | 041 1 | ATL2   | DEX600E  |
| 002 1 | POW2   |          | 022   |        |          | 042   |        |          |
| 003 1 | GRN14  |          | 023   |        |          | 043   |        |          |
| 004 1 |        |          | 024   |        |          | 044   |        |          |
| 005 1 |        |          | 025   |        |          | 045   |        |          |
| 006 1 |        |          | 026   |        |          | 046   |        |          |
| 007 1 |        |          | 027   |        |          | 047   |        |          |
| 008 1 |        |          | 028   |        |          | 048   |        |          |
| 009 1 |        |          | 029   |        |          | 049   |        |          |
| 010 1 |        |          | 030   |        |          | 050   |        |          |
| 011 1 |        |          | 031   |        |          | 051   |        |          |
| 012 1 |        |          | 032   |        |          | 052   |        |          |
| 013 1 |        |          | 033   |        |          | 053   |        |          |
| 014 1 |        |          | 034   |        |          | 054   |        |          |
| 015 1 |        |          | 035   |        |          | 055   |        |          |
| 016 1 |        |          | 036   |        |          | 056   |        |          |
| 017 1 |        |          | 037   |        |          | 057   |        |          |
| 018 1 |        |          | 038   |        |          | 058   |        |          |
| 019 1 |        |          | 039   |        |          | 059   |        |          |
| 020 1 |        |          | 040   |        |          | 060   |        |          |

ANICLS
ANINDX
FINDRT
GAP

| Config | Real Time | Trace Log | Comm Log | Terminate |

The Command Response Manager uses a Command Response Table to generate responses to messages.

| Column | Size | Description |
|---|---|---|
| 1412 Column | Size | Description |
| 1414 Entry | Integer | Unique Identifying Number |
| 1416 Command | Varying 0-256 characters | Selection Criteria |
| 1418 Response | Varying 0-256 characters | Response Text String |
| 1420 Next Response | integer | pointer to next response entry |
| 1422 Next Command | integer | pointer to next command entry |
| 1424 Next Condition | integer | pointer to next condition entry |
| 1426 Repeat | integer | repeat this message n times |
| Delay | integer | delay message n seconds |

Command Response Table Format

FIG. 14

SYSTEM AND METHOD FOR MANAGING COMPUTER SYSTEM RESOURCES USING COMMAND CONTROL VECTORS

CROSS-REFERENCE TO OTHER APPLICATIONS

This patent application is related to the following commonly owned United States Patent Applications:

1. U.S. Patent Application titled, "System and Method for Emulating Telecommunication Network Devices," Ser. No. 08/987,229, filed Dec. 9, 1997, by John V. McLain, Jr., and Damon Curnell, now U.S. Pat. No. 6,295,518;
2. U.S. Patent Application titled, "System and Method for Performing Hybrid Preemptive and Cooperative Multi-Tasking in a Computer System," Ser. No. 08/987,633, filed Dec. 9, 1997, by John V. McLain, Jr., and Damon Curnell, now U.S. Pat. No. 6,256,659;
3. U.S. Patent Application titled, "System and Method for Generating Responses to Inputs Using a Hybrid State Engine Table," Ser. No. 08/987,850, filed Dec. 9, 1997, by John V. McLain, Jr., and Damon Curnell, now U.S. Pat. No. 5,974,532;
4. U.S. Patent Application titled, "Method and Apparatus for Emulating a Dynamically Configured Digital Cross-Connect Network," Ser. No. 08/641,458, by John V. McLain, Jr., and James Dellinger, filed May 1, 1996, now U.S. Pat. No. 5,809,286;
5. U.S. Patent Application titled, "Method and Apparatus for Emulating a Digital Cross-Connect Network," Ser. No. 08/641,459, by John V. McLain, Jr., filed May 1, 1996, now U.S. Pat. No. 5,748,617;
6. U.S. Patent Application titled, "Method and Apparatus for Emulating Digital Cross-Connect Network using a Flexible Topology to Test MCS Network Management," Ser. No. 08/641,461, by John V. McLain, Jr., filed May 1, 1996, now U.S. Pat. No. 5,867,689;
7. U.S. Patent Application titled, "Method and Apparatus for Emulating a Network of State Monitoring Devices," Ser. No. 08/672,141, by John V. McLain, Jr., filed Jun. 27, 1996, now U.S. Pat. No. 5,812,826;
8. U.S. Patent Application titled, "Method and Apparatus for Simulating MultiTasking," Ser. No. 08/641,460, filed May 1, 1996, by John V. McLain, Jr., now U.S. Pat. No. 5,850,536;
9. U.S. Patent Application titled, "System, Method and Computer Program product for Digital Cross Connect Testing," Ser. No. 08/774,650, by John V. McLain, Jr., and Dale W. Harris, filed Dec. 30, 1996, now U.S. Pat. No. 5,954,829; and
10. U.S. Patent Application titled, "Digital Cross Connect Command Script Generator," Ser. No. 08/774,651, by John V. McLain, Jr. filed Dec. 31, 1996, now U.S. Pat. No. 5,854,930.

FIELD OF THE INVENTION

The present invention is directed to computer system resource management and, more particularly, to a system, method and computer program product for managing computer system resources using command control vectors.

RELATED ART

In computer applications such as, for example, telecommunication network device emulation applications, different tasks or processes often refer the same set of instructions in a method object to process tasks. Method objects can be, for example, a state engine table or a script. Typically, a separate copy of a method object is provided for each task or process. Where many processes refer to the same method object, such as for example, in a telecommunications network device emulator application, tens or hundreds of copies of the same method object may have to be provided. These copies take up considerable amounts of physical memory and communication overhead.

In multi-tasking systems, one or more processors alternate between processing different tasks. Typical multi-tasking systems employ preemptive time-slice processing where tasks are automatically interrupted after a predetermined period of time or after a specific instruction type. At some later point in time, processing of the task resumes, preferably from where it was interrupted.

In order to resume processing from where a task was interrupted, a pointer can be maintained for each task to identify a position within the copy of the method object associated with the task. When a task is interrupted by the multi-tasking system, the pointer maintains the current position within the copy of the method object. When processing of the task resumes, the pointer identifies the next instruction to execute within the method object.

When a process is interrupted there are typically one or more temporary values stored in registers that must be saved for when processing resumes. Thus, in addition to a pointer that points to a position within a method object, each task typically includes one or more additional pointers that point to temporary variables stored in memory. When processing of an interrupted task resumes, these pointers are used to retrieve the temporary variables.

Where there are tens, hundreds and perhaps thousands of current processes or tasks being multi-tasked, such as in, for example, a telecommunications network device emulator, management of separate copies of method objects for each process or task and management of multiple pointers for each process or task becomes a process that consumes considerable memory CPU and disk space.

What is needed, is a system, method and computer program product for multi-tasking that reduces the number of copies of method objects required for processing tasks and that combines all pointers and data objects associated with a task into a single command control vector.

SUMMARY OF THE INVENTION

The present invention is a system, method and computer program product for processing multiple tasks using a single copy of a method object and for combining all pointers and data associated with a task into a single command control vector. In one embodiment, the present invention is implemented as an integral part of a hybrid preemptive and cooperative multi-tasking system.

The present invention employs a command response manager to manage a queue of complex pointers or command control vectors (CCVs). A separate CCV is generated for each session thread. Each CCV points to one or more method objects that are used to process tasks. Each CCV maintains a variety of data associated with its thread such as, for example, status information and pointers that identify memory objects such as command response tables and scripts and pointers that identify data objects that store data associated with execution of a method object. Multiple CCVs can point to the same method object. Thus, only a single copy of a method object needs to be placed into physical memory. Each CCV can identify a separate data object for storing data for the respective CCV.

In one embodiment, each CCV points to a command response table method object that includes a variety of responses for a variety of inputs. A command response table can include instructions that invoke a script. Where a command response table includes a script invocation, a CCV that points to the command response table includes a field for pointing to the invoked script, a field for pointing to a particular offset within the script and a field for pointing to a temporary data object provided for storing data associated with execution of the script for the CCV.

Further features and advantages of the present invention, as well as the structure and operation of various embodiments of the present invention, are described in detail below with references to the following drawings.

BRIEF DESCRIPTION OF THE FIGURES

The present invention will be described with reference to the accompanying figures, wherein:

FIG. 12 contains Tables 1–5, illustrating sample data tables for configuration database 226 and log database files 228;

FIG. 13 illustrates a view of a main window of a TND emulator;

FIG. 14 illustrates one format of a command response table;

Figure 1:
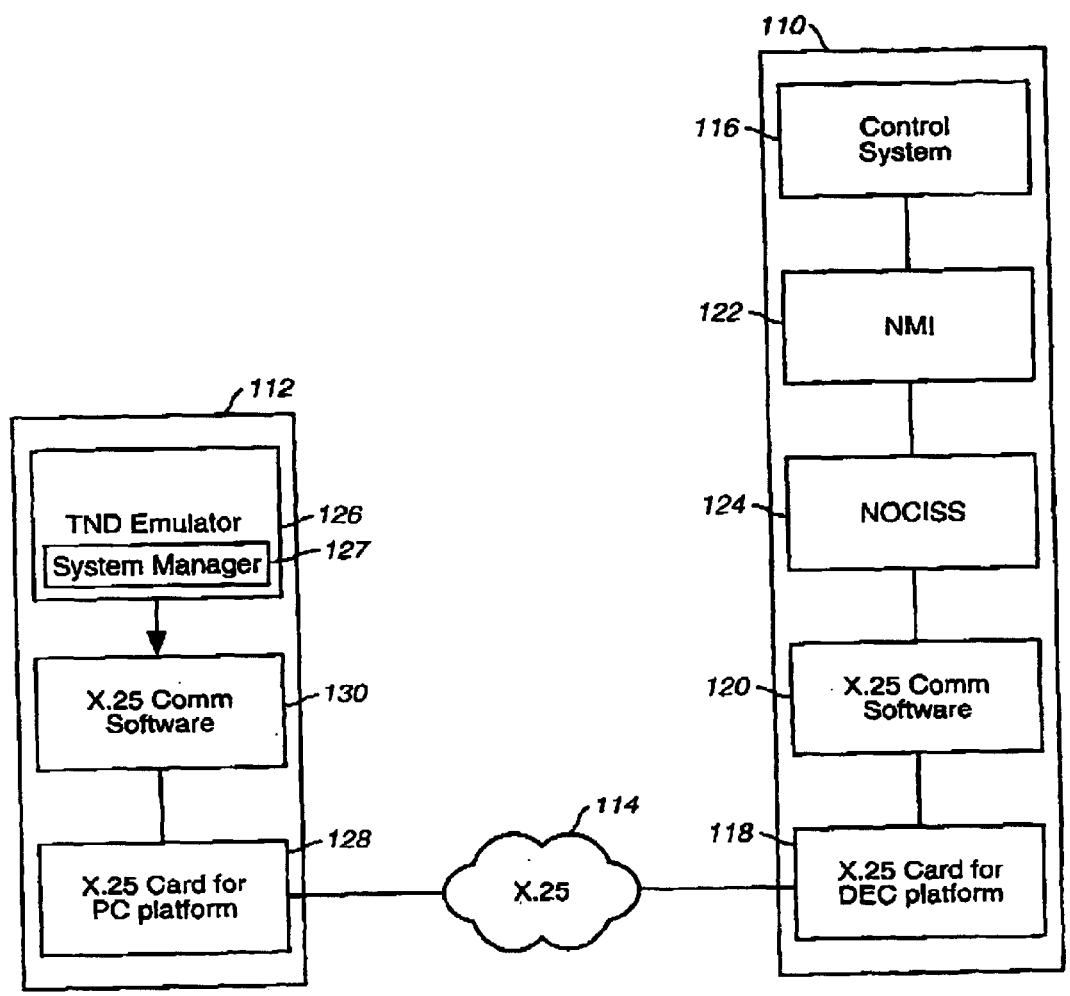
FIG. 1 is a high level block diagram of a telecommunications network device (TND) emulator coupled to a network control system.

The present invention will now be described with reference to the accompanying drawings. In the drawings, like reference numbers typically indicate identical or functionally similar elements. Additionally, the left-most digit(s) of a reference number typically identifies the drawing in which the reference number first appears.

DETAILED DESCRIPTION OF THE PREFERRED EMBODIMENTS

Table of Contents

I. Network Emulator Overview
II. Network Emulator Architecture
   A. Network Interface
   B. User Interface
   C. Database Manager
   D. Command Response Manager
      1. Command Response Tables
      2. Command Control Vectors
      3. Virtual Objects
   E. Script Interpreter
      1. Loadable Script Files
      2. RealNet Script Language
      3. Script Interpreter
   F. System Manager
      1. Hybrid Preemptive and Cooperative Multi-Tasking
   G. Computer Program Products
III. Method of Network Emulation
IV. Conclusions I. Network Emulator Overview The present invention provides a computer-implemented method and apparatus for emulating a telecommunications network by simultaneously emulating multiple independent activities normally performed by multiple network devices in a telecommunications network. The system provides both script and non-script responses to a control system. Script responses preferably work in conjunction with databases that contain data from actual network devices to generate realistic responses. The system, method and computer program product can employ a simulated multi-tasking controller to perform internal processes in apparent parallel.

II. Network Emulator Architecture

In one embodiment, a telecommunication network device (TND) emulator is implemented in software on a standard IBM-compatible PC, with a 386 or better microprocessor. However, one skilled in the art will realize that a TND emulator could also be implemented through hardware, software, firmware or any combination thereof.

Referring to FIG. 1, a high-level block diagram is provided in which a control system 116 is coupled to a TND emulator 126 via an interface network 114. Control system 116 is preferably implemented on a computer 110 that can be, for example, a Digital Equipment Corporation (DEC) platform such as a VAX, an Alpha mid-range or an IBM RS/6000. Any other suitable computer can be employed as well.

TND emulator 126 can be implemented on a conventional personal computer platform or PC 112. TND emulator 126 tests control system 116 under realistic network conditions by emulating up to thousands of network devices.

Interface network 114 can employ an X.25 communications protocol, which is a common protocol for telecommunications network operations and control. X.25 network 114 can be an actual X.25 network, as is used in production environment, or it can be a direct cable link. Alternatively, any other suitable protocol can be used.

Control system computer 110 includes an interface card 118 for interfacing with interface network 114. Where interface network 114 employs an X.25 protocol, and where control system computer 110 is a DEC computer, interface card 118 is preferably an X.25 card designed for a DEC platform. Preferably, interface card 118 is modular so that other protocols can be substituted if necessary.

Interface card 118 works in conjunction with X.25 communications software 120. Where control system computer 110 is a DEC platform, and where X.25 communications protocol is employed, X.25 communications software is preferably a PSI package manufactured by DEC.

A network management interface (NMI) 122 and a network object communications interface (NOCISS) 124 support communications between control system 116 and TND emulator 126. Use of these can vary with configurations of the control system and the testing environment.

PC 112 includes an interface card 128 for interfacing with interface network 114. Where interface network 114 employs an X.25 protocol, interface card 128 is preferably an X.25 card designed for a PC platform. Preferably, interface card 128 is modular so that other protocols can be substituted if necessary. Interface card 128 works in conjunction with X.25 communications software 130. Software 130 can be stored in a memory of PC 112.

Figure 2:
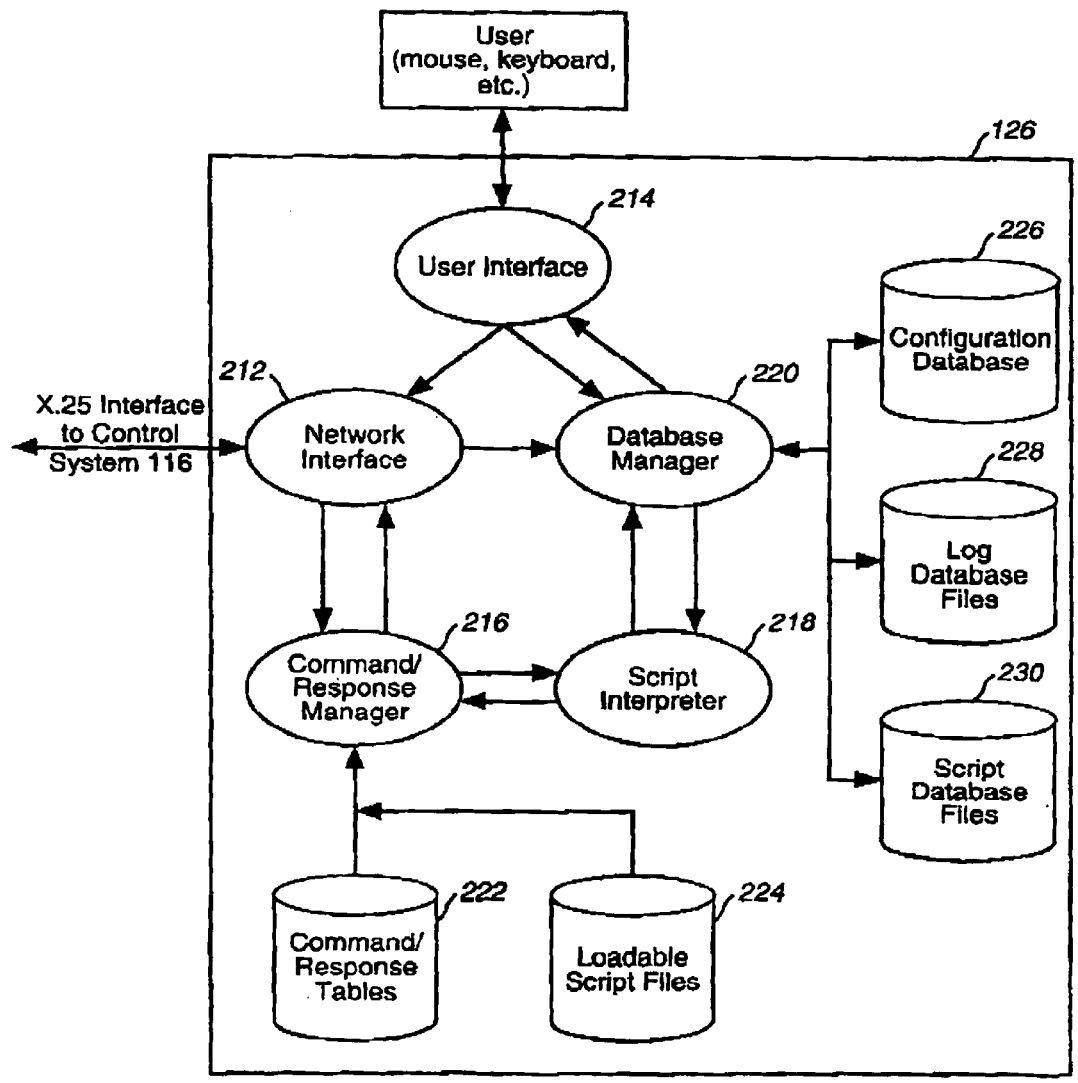
FIG. 2 is a block diagram illustrating the logical components and databases of the TND emulator of FIG. 1.

Referring to FIG. 2, TND emulator 126 includes a variety of modules. A network interface 212 module provides communications between TND emulator 126 and control system 110. A user interface module 214 receives user inputs and provides user outputs. A command response manager module 216 reads control system commands and generates responses. A script interpreter module 218 executes scripts. Details of each module and associated databases are provided below.

In one embodiment, TND emulator 126 includes a hybrid preemptive and cooperative multi-tasking controller 127 (system manager 127), for controlling processes of the various modules in apparent parallel. Multi-tasking controller 127 can be programmed into the code of TND emulator 112. Alternatively, multi-tasking controller 127 can be implemented as an independent module that operates in conjunction with an existing operating system. Alternatively, multi-tasking controller 127 can be implemented as an integral part of an operating system.

Under control of multi-tasking controller 127, TND emulator 112 can communicate with control system 110, accept user input via user interface 214, provide output to the user's monitor via user interface 214, execute scripts, read commands, formulate responses, and perform database functions, apparently simultaneously and without any perceived interruption to any process. TND emulator 112 can also perform these functions for multiple logical connections (communications sessions) with control system 110, in emulation of multiple network devices running in parallel.

A. Network Interface

Network interface 212 is responsible for communications with control system 110. Network interface 212 can respond to low-level protocol and provides a default protocol response when necessary. Network interface 212 conducts multiple conversations, preferably via X.25. Network interface 212 logs inbound and outbound messages, responds to all unsolicited inbound messages and controls network interface X.25 conversation until either a protocol interrupt or data-block arrives.

When network interface 212 receives one of these events, the event is queued for command response manager 216 processing. Network interface 212 then suspends the X.25 session and performs no other operations until command response manager 216 generates a response or until an unsolicited message is received. Network interface 212 updates a display window (not shown) with status of each session, immediately after a message is received or transmitted.

B. User Interface

TND emulator 126 can run on a standard PC 112 and utilize conventional means for user input and output such as a mouse, keyboard, and monitor. User interface 214 handles interactions between computer 112 and various user interface devices. User interface 214 includes a variety of drivers and software for supporting user interaction.

FIG. 13 illustrates a view of a main window of TND emulator 112. User interface 214 controls user displays and user interaction. User interface 214 handles displays for script databases and log files, controls a screen-saver feature and controls real-time display.

C. Database Manager

Database manager 220 manages a variety of databases that are employed by TND emulator 126. Databases store files for operation and can be maintained in one or more physical storage devices. Database manager 220 performs database functions such as, for example, add, delete, modify and retrieve.

Database manager 220 also interacts with user interface 214, network interface 212 and script interpreter 218.

Database manager 220 is a series of callable routines that can be used to access and update various system databases. Database manager 220 can be developed using Paradox TM 1.0 engine. Database manager 220 preferably uses a cursor to access and retrieve information from associated databases. The cursor can be a work area stored in expanded memory.

Databases employed by TND emulator 126 preferably include a configuration database files 226 for storing configuration data for system 112. Data stored in configuration database files 226 identifies each network device that is being emulated. Identification includes the type of device and the command and response format used for controlling each device. Configuration data be received from a control system under test and can include network topology, communication addresses, device names and translations.

Referring to Table 1 of FIG. 12, the data stored in a device type database replicates nomenclature used for devices in a network. The device identification of the switches must match information stored in this table for proper initialization of the system. Table 2 of FIG. 12 provides a cross-reference of device types and device identifications. For example, if a DEX600E switch is to be emulated, the device type field must be set to a "6".

TND emulator 126 preferably includes log database files 228 containing a communications log for storing messages sent and received by the TND emulator. A sample communications log is shown in Table 4 of FIG. 12. Log database 228 also includes a trace log for reporting errors and system status. The trace log can be a circular file of records. A sample trace log is shown in Table 3 of FIG. 12.

Referring to Table 5 of FIG. 12, TND emulator 126 preferably employs a cross-reference database to allow each device configured in a database to have its own set of tables. There can be 20 or more tables per device in such a file.

Scripts, however, are generic. In order to maintain the generalities of the scripts, this table allows scripts to access tables belonging to a device using a generic name. Thus, the same script can be executed by many different devices with any modification to the script. A script acts on a table using the finance identification of the device executing the script and generic table name declared by its cursor. This information is passed to database manager 220 when a script requests access to a table. The actual table name is invisible to the script.

The above-method is preferred because DOS can only handle eleven character filenames. Paradox TM reserves three characters (the file extension) for its naming convention so only eight characters remain for use as an actual table name. Database manager 220 controls generation of unique DOS filenames and uses this name to access, retrieve and update tables as requested by scripts. For example, database manager 220 could use a file naming convention of RN_Fxxxx, where xxxx is a numeric sequence ranging from 0000 to 9999.

TND emulator 126 preferably can employ a script database 230 for storing data for script execution. This data reflects data tables that are maintained in actual network devices.

In operation, when a process needs data from a database, a request is sent to database manager 220 using a cursor. Database manager 220 processes the request and returns the cursor populated with data extracted from the database.

On initialization, database manager 220 loads configuration from a configuration database 226 into a globally accessible area of memory. Database manager 220 computes the number of sessions configured. After session computation, database manager 220 verifies existence of a trace log and communication log. If neither log file exists, database manager 220 allocates and initializes them.

When log file verification is complete, database manager 220 checks the validity of contents of the switch table names to the DOS file names cross reference data base. The cross-reference data base is reconciled to insure that all tables for each switch type are identified. When tables cannot be found for a defined switch, new tables can be propagated from a like-switch type.

D. Command Response Manager

Command response manager 216 facilitates emulation of real switches in a network. Command response manager 216 reads control system commands and generates appropriate responses. Command response manager 216 is responsible for session control, reading control system commands and formulating responses. All commands sent from control system 116 are initially processed by command response manager 216. Commands can be device-specific instructions that would normally be handled by a network device. Commands are not to be confused with protocol, which is handled by network interface 212.

Command response manager 216 employs one or more command response tables stored in command response table database 222. Command response tables can call loadable script files from loadable script file database 224. Databases 222 and 224 provide input to command response manager 216 and do not require extensive management. Additional details of command response tables are provided below.

Command response manager 216 employs command control vectors (CCVs) to control processing of input messages, which can include generation of responses to input messages. Command response manager 216 allocates a CCV for each input command to be processed. The CCV contains session status information, a buffer and pointer into a command response table. CCVs are described more fully below.

CCVs can be generated upon system initialization or dynamically, as needed. In a network emulation environment, a predetermined number of CCVs are preferably allocated at initialization rather than generated dynamically. This is because network device emulators typically conduct communications with tens or hundreds of devices at a time. Such a communication load can require more CCVs than system memory can handle. In a system that dynamically generates CCVs, when there is insufficient memory to generate the necessary number of CCVs, a system anomaly can result. However, in a system that generates a predetermined number of CCVs, the system is never presented with the dilemma of generating a CCV for which there is insufficient memory. Although the system might conceivably run out of CCVs for handling input messages, that is preferable to a system anomaly.

When a message is received from control system 110, network interface 212 places a service request in a message queue of command response manager 216. When command response manager 216 is invoked, possibly by a multi-tasking controller or operating system, command response manager 216 reads the message queue and begins processing. The message queue contains session and protocol information and a pointer to a message buffer. Command response manager 216, using session information stored in the process request, selects an appropriate CCV and begins message generation. The process is described more fully below.

1. Command Response Tables

Command response tables are used to generate multiple levels of responses to inputs. In one embodiment, command response tables provide up to three levels of responses including simple, unintelligent responses; intelligent responses using simple commands; and detailed logical responses. Detailed logical responses can be provided through script invocations.

Command response tables can be thought of as a large table containing selection criteria used to parse an in-bound message and take a specific action. Put in programmatic terms, a command response table is a large case statement. Command response tables provide a sequence of events. Once a sequence of events is established, it will always be followed in the same manner. Command response tables are preferably pre-loaded into memory so that command response manager 216 can quickly search the table and generate a response.

Referring to FIG. 14, a sample format of a command response table entry 1410 is provided. Each entry 1410 includes an entry field 1412 containing a unique identifying number. A command field 1414 identifies a particular command that can be received by TND emulator 126. A response field 1416 provides an appropriate response for the command identified in field 1414.

Each entry 1410 can also include a number of additional field such as, for example, a next response field 1418, a next command field 1420, a next condition field 1422, a repeat field 1424 and a delay field 1426. Additional fields 1418–1426 are described more fully below.

Command response manager 216 uses a message pointer to determine which entry will control response generation. The message pointer can be part of a command control vector. On initialization, the message pointer is positioned at the first entry in a command response table. When a command is received from network interface 212, a command column containing command fields 1414 is searched for a match. If the command is found in the command column, command response manager 216 takes action as indicated by an associated response field 1416.

Actions can include a first level of response for unintelligently responding to certain inputs, a second level of response for intelligently responding to certain inputs using simple commands and a third level of response for providing detailed logical responses by invoking a script.

For simple, unintelligent responses, command response tables provide quick responses and fast implementation. For example, if the word "hello" is received, a simple, unintelligent responses can be "hello." Simple, unintelligent response times are typically less than one millisecond when using a 33 MHz central processing unit (CPU).

For a first level simple response, command response manager 216 uses response field 1416 to format a message. Command response manager 216 then calls network interface 212 to transmit the data. Once the transmit is complete, command response manager 216 is inactivated until the next request is received.

For a second level response, the command response table can employ simple instructions such as, repeat, delay, message parsing and response. For example, if the word "hello" is received, a simple instruction can check the time of day and, based upon the time of day, provide a response of "good morning," "good afternoon," or "good evening."

For a third level response, where the response field of the command response table is a script invocation, command response manager 216 preferably checks to see if the script is already loaded. If the script is loaded, control is passed to script interpreter 218. If the script is not loaded, command response manager 216 searches loadable script files 224 for the script. If the script is found, the script is loaded and control is passed to script interpreter 218. Script interpreter 218 is discussed more fully below. When the script is not found, a default response can be transmitted to prevent or reduce anomalies.

After script interpreter 218 executes the script, script interpreter 218 updates the command control vector and returns control to command response manager 216. After script interpreter 218 returns control to command response manager 216, several actions can be taken on the status returned. If the script execution failed, command response manager 216 sends a default response and returns control to the system manager. If the script issued a request for data, command response manager 216 transmits a message buffer and returns control to the control system. If the script completed successfully, command response manager 216 transmits a message buffer and returns control to the control system. If the script issued request for more time, command response manager 216 transmits a message buffer if any data is ready and re-queues the command response manager request that started this action. Command response manager 216 then returns control to the system manager.

After a response is generated, command response manager 216 can take additional action based on the contents of any remaining command response table fields. For example, if there is an entry in repeat field 1424, command response manager 216 repeats sending of the response until a threshold is met. If there is an entry in next response field 1418, command response manager 216 positions the message pointer to the table entry pointed to and then chains the response to the last response sent. Command response manager 216 then restarts message generation. If there is an entry in next condition field 1422, command response manager sets a conditional flag and waits for the next inbound message. On subsequent messages, if the condition flag is raised, command response manager 216 conducts a specific search for selection criteria using entries chained to the next condition field until a match is found or until the search is exhausted. If there is an entry in next command field 1420, command response manager 216 sets a next command flag and waits for the next inbound message. If the next command flag is raised, command response manager 216 generates the response using the response text and restarts message generation.

Command response tables can be generated in any of a variety of formats, using any of a variety of techniques, such as known techniques employed for state engine tables.

In one embodiment, a command response table is provided for each device type and version of a device type. In another embodiment, a single command response table is provided for each device type regardless of version. In another embodiment, a single command response table is provided for all device types.

Preferably, command response tables are compiled into a loadable image. A loadable image is a condensed representation that is easily understood by an application or interpreter. A loadable image can be, for example, machine code, a bit map or other instructions. Condensed representations load faster than an image raw images (i.e., human readable form). Loadable images can be used with a command response table interpreter. The command response table interpreter can implemented as part of an operating system or system manager. Where a command response table interpreter is implemented in an operating system or system manager, command response tables can be ported to other systems by simply recompiling the system manager or operating system. The recompiled interpreter will interpret the loadable images without recompiling the loadable images.

2. Command Control Vectors

Command response manager 216 can employ command control vectors (CCVs) for managing processing tasks. A CCV identifies a task or thread that requires processing time and includes pointers to method objects and data objects that are to be used for processing the task. Method objects can include command response tables and scripts.

Figure 9:
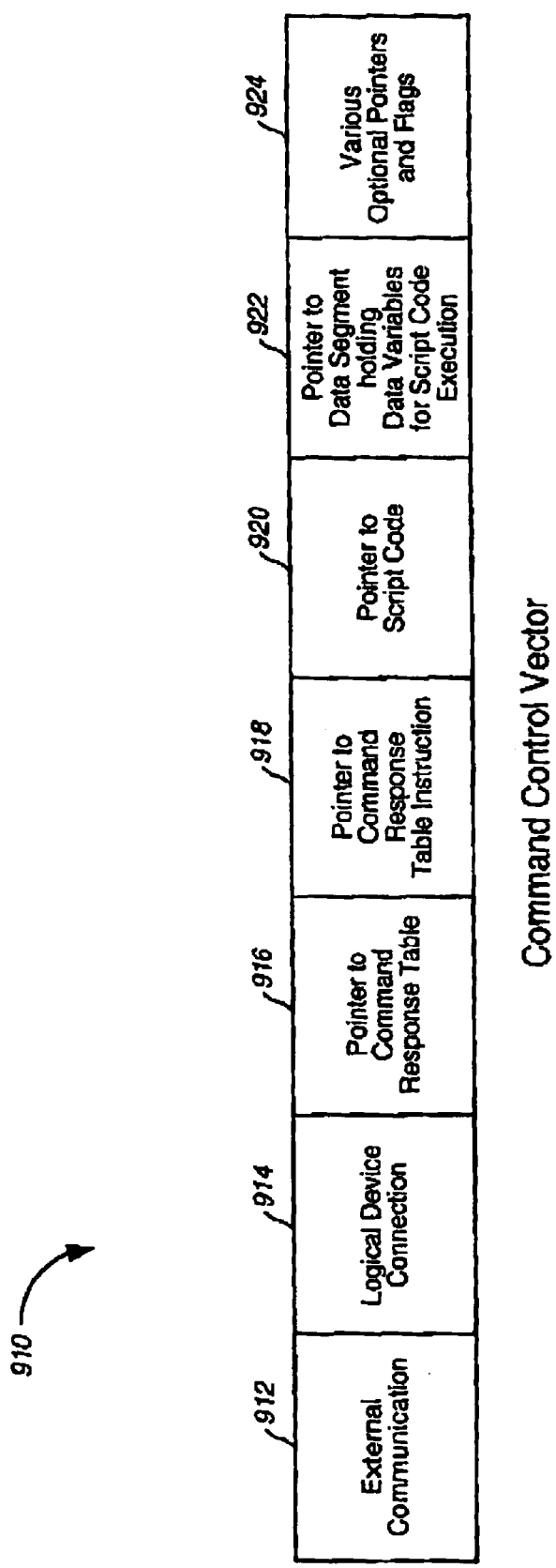
FIG. 9 illustrates a command control vector for maintaining pointers and data associated with in input command.

Referring to FIG. 9, a CCV 910 includes fields 912–924 for identifying data associated with a process or task. Field 912 can identify any source of communication that generates threads for processing by a processor. Where command control vector 910 is implemented in a network emulator, field 912 can identify a source of external communication such as a terminal of a telecommunications control system 116 that is under test.

Field 914 provides additional details associated with field 912. For example, if the external communication identified in field 912 is an input from a telecommunications control system 116, field 914 can identify a particular type of network device that the telecommunications control system is trying to control. Field 914 can include the actual command sent by control system 116.

Field 916 contains a pointer to a method object that contains instructions for processing the task. The method object identified in field 916 can be a command response table. Field 918 contains a pointer to a particular instruction within the method object or command response table identified in field 916.

Recall that command response tables can include script invocations. Thus, field 918 can point to a script invocation within command response table. When field 918 points to a script invocation, field 920 provides a pointer to a particular line of the invoked script code. Thus the script is identified by a pointer in field 918 and an instruction within the script is identified by a pointer in field 920.

When field 920 points to a script, field 922 provides a pointer to a data segment of data object. A data object is a portion of memory associated with a particular CCV and that is used for temporary storage of values generated by the script. A data object can be identified when a script is invoked and released when the script terminates. Fields 920 and 922 together identify what is referred to herein as a virtual object. Virtual objects are described more fully below, with reference to FIG. 11.

A variety of other optional pointers and flags can be provided in CCV 910 as indicated by fields 924.

One advantage of CCVs is that they permit more than one thread or task to point to the same copy of a command response table, script or other method object. CCVs thus permit multiple tasks to be processed using a single copy of a command response table, script or other method object. By employing command control vectors, memory and time are saved by not having to retrieve and store a duplicate copies of method objects. This is a big advantage in systems such as network emulators that have to generate responses for up to thousands of emulated telecommunications devices and that would otherwise have to provide and maintain a separate copy of a method object for each task.

Figure 10:
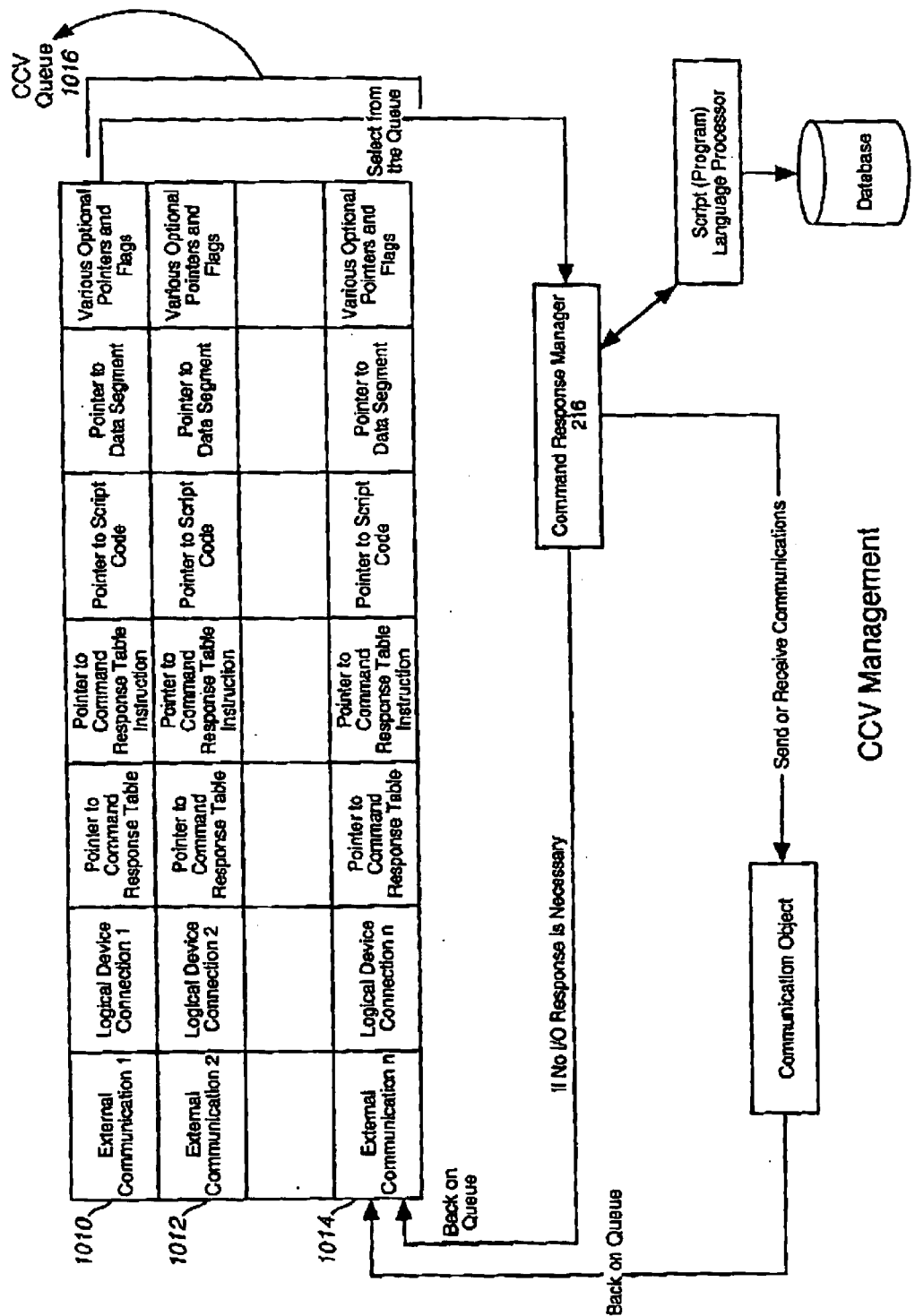
FIG. 10 illustrates a command control vector queue maintained by the command response manager of FIG. 2.

Referring to FIG. 10, command response manager 216 preferably handles CCVs on a first in, first out (FIFO) basis. Alternatively, each CCV can include an additional field for assigning priority.

CCVs 1010–1014 are stacked in a CCV queue 1016. When command response manager 216 is invoked, it selects the top CCV, shown here as CCV 1010, for processing. Command response manager 216 will examine pointer fields 912–924 and then take appropriate action. For example, where field 918 points to a command response table, command response manager 216 will access that table. In a multi-tasking environment, where command response manager is invoked for a period of time or for a select number of instructions, processing of top CCV 1010 might have been interrupted in a prior command response manager processing session.

If CCV 1010 is just beginning to be processed, command response manager 216 searches the command response table for a command identified in CCV 1010. In a network emulating environment, the command can be stored in field 914. If command response manager had previously been processing CCV 1010 in a prior processing session and was interrupted, processing will begin at a point identified in field 918.

In either event, when processing of CCV 1010 begins, field 918 maintains a pointer to a current instruction. If processing of CCV 1010 is interrupted, CCV 1010 is returned to the queue so that processing can resume at a later time exactly where it was interrupted.

If field 918 of CCV 1010 points to a script invocation, command response manager 216 invokes script interpreter 218. Script processing is described more fully below. When CCV 1010 generates an output, the output is sent to network interface 212.

3. Virtual Objects

Virtual objects are generated by command control vectors. Virtual objects include a method object (i.e., set of instructions) and an associated data object for storing data associated with execution of the method object. The method object can be shared by multiple virtual objects. Using virtual objects, a single copy of a command response table or script code is made available to multiple CCVs. Thus, no CCV has exclusive control over a set of instructions. Instead, each CCV can execute the instructions independent of other CCVs. Virtual objects permit multiple tasks to be processed using a single copy of a method object. Virtual objects can include command response tables and scripts.

Conventional object-oriented systems capture data and method (or data and logic) in one unit. In contrast, the present invention employs virtual objects to separate data from logic so that different data sets can use the same logic. This avoids unnecessary duplication and storing of multiple instances of the same logic.

Virtual objects can be employed by a variety of systems to reduce multiple instances and transmission of method information or logic. For example, virtual objects can be used to reduce internet traffic by passing multiple data sets without passing multiple method information or logic.

Figure 11:
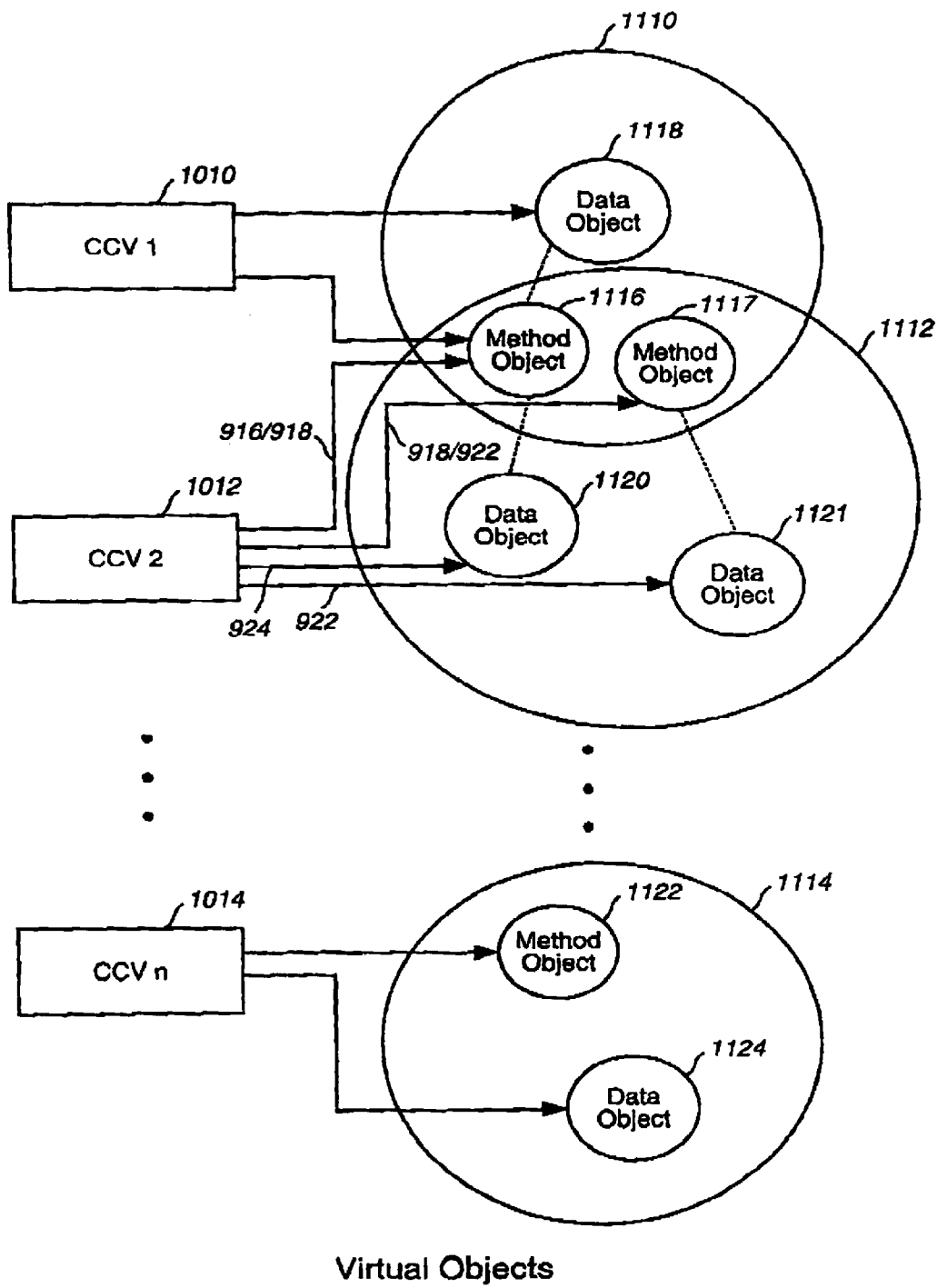
FIG. 11 illustrates virtual objects formed by a single copy of a data object that is shared by multiple command control vectors and by data segments that are associated with individual command control vectors.

Referring to FIG. 11, virtual objects 1110, 1112 and 1114 are generated by CCVs 1010, 1012 and 1014 respectively. Each virtual object can include one or more method objects and zero, one or more data objects.

For example, virtual object 1112 can include method objects 1116, 1117 and data objects 1120 and 1121. Data objects 1120 and 1121 are associated with method objects 1116 and 1117, respectively. Method object 1116 can be, for example, a command response table that is pointed to by CCV pointer 916. Method object 1116 includes instructions that are pointed to by CCV pointer 918. Data object 1120 can store data used for and/or generated by execution of method object 1116 by CCV 1012. Data object 1120 is pointed to by a CCV pointer 942.

Method object 1117 can be, for example, a script that is invoked by an instruction within method object 1116. The script can be pointed to by the same CCV pointer 918 that invoked the script. The script can include instructions that are pointed to by CCV pointer 920. Data object 1121 can store data for and/or generated by execution of method object 1116 by CCV 1012. Data object 1121 is pointed to by CCV pointer 922.

Virtual object 1110 includes the same method objects 1116 and 1117 that forms part of virtual object 1110. Virtual object 1112 also includes data object 1118, associated with method object 1116. Data object 1118 can be used to store data for execution of method object 1116 by CCV 1010.

Virtual objects 1110 and 1112 illustrate how more than one command control vector can point to the same copy of a script, command response table or any other method object to process tasks. In a telecommunication network emulator environment, method object 1117 can be a command response table and method object 1116 can be script code. When processing CCV 1010, command response manager 216 executes instructions from command response table 1117 that are pointed to by field 918 of CCV 1010. Command response manager 216 also executes instructions from script code 1116 that are pointed to by field 920 of CCV 1010. Data associated with processing of script code 1116 for CCV 1010 is stored in data object 1118, identified by pointer 922.

When processing CCV 1012, command response manager 216 executes instructions from command response table 1117 that are pointed to by field 918 of CCV 1012. Command response manager 216 also executes instructions from script code 1116 that are pointed to field 920 of CCV 1012. Data associated with processing of script code 1116 for CCV 1012 is stored in a data object 1120, identified by field 922 in CCV 1012.

A virtual object can include just a method object, and a data object or any combination of method objects and data objects. For example, virtual object 1114 includes method object 1124 and data object 1122. Method object 1124 can be, for example, script code.

When processing CCV 1014, command response manager 216 executes instructions from script code 1124, identified by field 920 in CCV 1014. Data associated with processing of script code 1124 is stored in data object 1122, identified by field 922 in CCV 1014.

CCVs permit multiple threads to use a single copy of a command response table or script code, thus eliminating the need for a separate copy of a command response table or script code for each thread. CCVs free substantial amounts of memory that otherwise would be used for multiple copies of identical logic.

E. Script Interpreter

1. Loadable Script Files

Scripts are used by command response tables to generate detailed logical responses to inputs. Scripts are a specific action in a command response table. In one embodiment, scripts include a RealNet Script Language (RSL), described below, to create realistic responses based on data stored in script database files 230. Scripts are subordinate to the command response table because the table must be used to execute a script. Scripts responses typically take less than 10 milliseconds when using a 33 MHz CPU.

Script database files 230 preferably include data from actual telecommunications network devices. Scripts can store, update, retrieve and validate data. Scripts can be used to provide a greater degree of realism than that provided by a simple response that is pre-loaded into a command response table.

For example, assume that the command "update my table with ABC" would normally result in the response "okay" if ABC was already on file; and "failed" if ABC was not on file. A simple response, or even an intelligent response using simple commands from a command response table, can only return one of the conditions, "okay" or "failed." It cannot determine whether data is in the file.

In contrast, a script can be programmed to return "okay" if data was present; and "failed" if data was not. A script can also save the data in a facsimile of the table. In addition to the above example, one skilled in the art will recognize that scripts can be generated to perform any of a wide variety of tasks.

2. RealNet Script Language

In one embodiment, scripts are written using a RealNet script language (RSL), developed by MCI Corporation. RSL is a procedural language composed of three simple constructs: variables, operands, and statements.

Variables can be simple or complex. Simple variables hold either a character string or integer value. Complex variables hold a list of simple variables.

Simple and complex variables are stored in one of three pools: a literal pool, a variable pool, or a temporary pool. A pool is a list of variables, either complex or simple.

The literal pool is used to store constants and literals declared within the program. The variables stored in this list can be initialized to a predefined value and can not be modified during the course of script execution.

The variable pool is used to store user-declared variables and can be modified.

The temporary pool is invisible to the user. The variables stored in the temporary pool are dynamic and result when script interpreter 218 must resolve a complex equation. The variables in the temporary pool are deleted after they are no longer needed.

Operands are used to reference variables. Several operands can point to the same variable. This allows reduction of storage by allowing a variable to be stored only once. Operands contain an operator that can be arithmetic, relational, or format-related. The operand/operator relationship is used to store expressions using infix notation. Each operator is stored using its rank in precedence. Parenthesized operations are achieved simply by multiplying the operator by (nesting level +1).

Statements are composed of a token and a list of operands. A token is the nucleus of the statement. The token describes how script interpreter 218 will act on the operands in the statement's operand list. Operands are linked together to form an operand list or expression. Expressions are resolved from left to right. A sequence number is used for debugging a script and represents the actual line number in which the statement was actually stored in the script source file. Conditional tokens, such as "while" and "if", store an optional field branch that contains a pointer to the statement where program execution should continue if the expression evaluates to false.

A tokenized script is composed of a list of statements, an operand list, a variable pool, and a literal pool. Script interpreter 218 maintains pointers to the first statement in the statement list and to the current statement being executed. Script interpreter 218 executes the script by moving the current statement pointer down the statement list sequentially and evaluating each statement as it passes. The top of list and current statement pointers are stored in the command control vector of command response manager 216. These are the only two pieces of information needed by script interpreter 218 to execute a script since all of the other components are self-referencing. The pointers enable script interpreter 218 to swap a script into memory from either disk storage or expanded memory and to execute the script as the script was in memory. In order to achieve this, tokenized or compiled scripts are stored in a format that allows them to be loaded directly into memory.

3. Script Interpreter

In one embodiment, scripts are compiled to a loadable image prior to storage in database 224. A system manager or an operating system can include a script interpreter, such as script interpreter 218, for interpreting the compiled scripts. In this way, the system can be ported to other processor systems by simply recompiling the system manager or operating system. The scripts, having been compiled to an assembly level for use by the script interpreter, need not be recompiled.

Script interpreter 218 is responsible for actual script execution. Script interpreter 218 ensures that a script either completes successfully or that a failure returns control to command response manager 216.

When a script is loaded in memory, preferably in expanded memory, by command response manager 216, control is passed to script interpreter 218 to execute the script. Script interpreter 218 is responsible for the orderly execution of the script and for termination of the script in the event of errors. In one embodiment, script interpreter 218 completes all of the script possible within a user-defined interval and then returns control to command response manager 216 under one of the following conditions:

the script completes execution;

the user-defined interval expires; or the script requests input from the system manager.

Script interpreter 218 initiates and formats all database requests required by the script. Calls made to the database are single-action calls. For instance, to access a table and find a record requires three separate calls to the server (open table, find record, close table). If a script runs out of time or requests additional input, script interpreter 218 maintains all information using the CCV so that it can resume execution where it stopped, when control is returned to script interpreter 218. A stand-alone version of script interpreter 218 can be used for testing and development of scripts.

F. System Manager

TND emulator 112 includes a system manager 127 that controls various processes and interactions between the logical components of TND emulator 126 and provides a mechanism for invoking and terminating processes. In one embodiment, system manager 127 interacts with an existing operating system installed on PC 112. In an alternative embodiment, system manager 127 is an integral part of an operating system.

System manager 127 is responsible for initializing the system, validating software, verifying hardware, controlling program execution and termination of the system, when appropriate. The control system starts all components, verifies successful initializations, verifies the existence of expanded memory system (EMS), a mouse, video graphics array (VGA) screen capability and disk storage capacity.

After system manager 127 performs verifications, it allocates expanded memory for database manager 220 and user interface 214. System manager 127 also initializes database manager 220, a command response manager 216 and network interface 212.

When initialization is complete, system manager 127 enters a control loop that polls network interface 212 for communications and time-outs, monitors a queue of command response manager 216, monitors user interface 214 for user interaction, monitors a queue of database manager 220. This loop is repeated indefinitely until termination. Upon termination, system manager 127 terminates any active interfaces with control system 110, terminates any tasks executing in command response manager 216 and frees expanded memory. System manager 127 preferably monitors itself in order to reduce conflicts. Where system manager 127 is self-monitoring, it preferably generates a TND self-monitoring emulator report. System manager 127 can execute a screen saver program if there is no activity for a given amount of time.

1. Hybrid Preemptive and Cooperative Multi-tasking

Conventional multi-tasking systems include preemptive multi-tasking systems and cooperative multi-tasking systems.

In conventional preemptive multi-tasking systems, threads are processed based on allotted time slices, where each thread is allotted a certain amount of processing time, known as a time slice. When a time slice expires, processing of one thread is interrupted so that another thread can be processed. A pointer is typically provided for indicating where in a stream of instructions processing was interrupted. When processing resumes at a later time, the pointer identifies the next instruction to be executed.

In time-slice preemptive processing, whenever processing of a thread is interrupted, a variety of temporary values must typically be stored until processing of the thread resumes. For example, a first thread can involve a number of machine instructions to complete, such as the calculation of (A+B) (C+D). A first machine instruction can add (A+B). A second machine instruction can place the calculated value of (A+B) into a first register. A third machine instruction can calculate (C+D). A fourth machine instruction can place the value (C+D) in a second register. A fifth machine instruction can retrieve the value (A+B) from the first register and the value (C+D) from the second register for multiplication. Finally, a sixth instruction might output the calculated value, (A+B) (C+D), to memory for use by anther thread or process at a later time.

If the time slice allotted to the first thread expires between the fourth and fifth instructions, the values stored in the first and second registers would have to be stored in memory so that processing could resume at the fifth instruction at a later point in time. A separate pointer is required for each value to insure that the values could be retrieved when processing of this thread resumes. An instruction pointer is required to identify the fifth instruction that is to be executed when processing of the thread resumes.

In the above example, the values can be stored in local physical memory. However, local physical memory is often required for processing subsequent threads. Thus, the stored values might later be moved to a hard disk or other peripheral storage device. In either event, storage and subsequent retrieval of data takes valuable time that could otherwise be spent processing threads.

Time slice-based preemptive multi-tasking systems are thus time and resource consuming because of so many memory reads and writes. Each additional storage of a temporary variable and an associated pointer consumes valuable memory.

In cooperative multi-tasking systems, application programmers design applications with interruption points. When an interruption point is reached, the operating system can switch to another task. Designers can set interruption points where relatively few temporary values need to be stored. Cooperative multi-tasking systems tend to require fewer temporary storage location and thus can be faster than preemptive multi-tasking systems.

In cooperative multi-tasking systems, however, each application must be designed as a cooperative application. Otherwise, because the operating system has no way to force, or preempt, operation, after an application begins execution, if the application does not freely give up control, it will continue to execute until it terminates. In such a situation there is no multi-tasking.

In one embodiment of the present invention, system manager 127 is a hybrid preemptive and cooperative multi-tasking system that executes processor instructions in multiples of logical units of work in order. Logical units of work include a set of one or more machine instructions, the completion of which is a logical stopping point. In other words, a logical stopping point is where a logical sequence of events or instructions completes. Thus, where a script includes instructions for performing a number of different calculations, logical stopping points can be defined as locations in the script where each individual calculation is complete.

A logical unit of work can be, for example, a single instruction in a script of instructions that employs a number of individual machine code instructions. In the example above, a logical stopping point might be at the end of the sixth instruction where the contents of the first and second registers are no longer required by the thread. Logical units of work can also be referred to as smallest logical units of work.

By processing preemptive logical units of work, substantial amounts of memory are freed because there is no longer a need to store substantial amounts of data values from registers whenever processing of a thread is interrupted. Instead, only a pointer to a next instruction is typically required.

Figure 15:
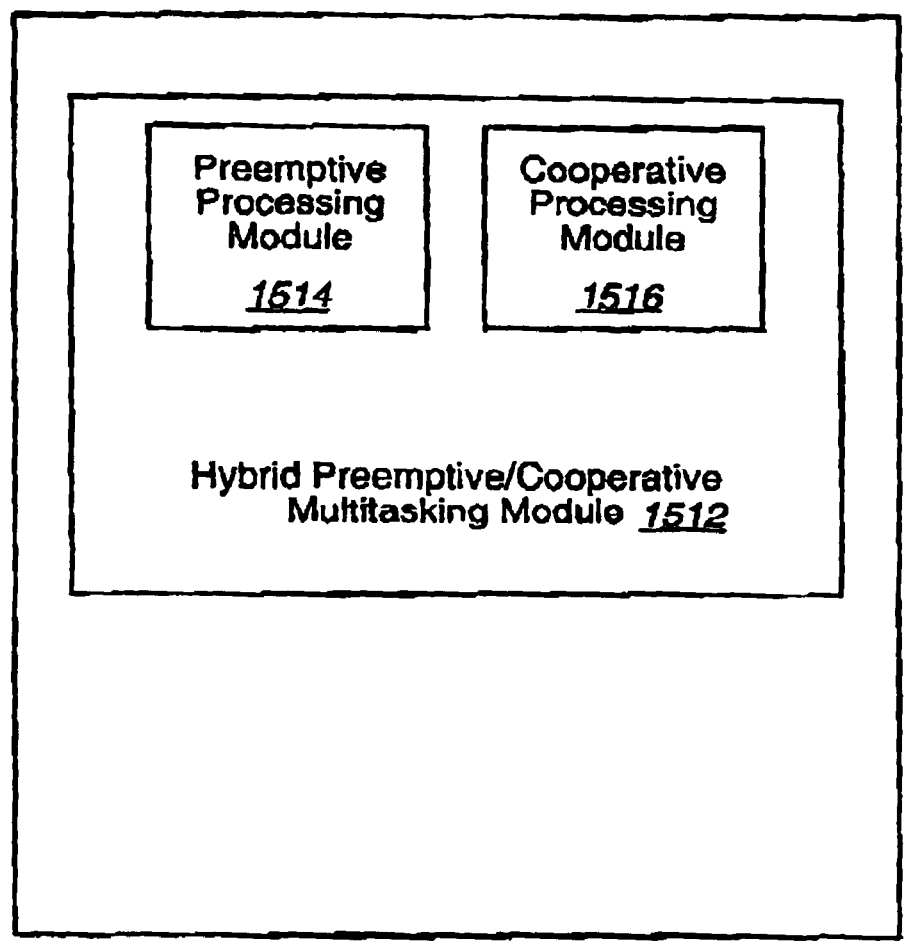
FIG. 15 is block diagram of a hybrid preemptive/cooperative multi-tasking system manager.

Referring to FIG. 15, system manager 127 includes a hybrid preemptive and cooperative multi-tasking module 1512. Module 1512 includes a preemptive processing portion, or module, 1514 and a cooperative processing portion, or module, 1516.

Preemptive processing module 1514 includes instructions for processing a logical unit of work for each type of task that system manager 127 is expected to process. For example, referring back to FIG. 4, module 1514 includes instructions that define a logical unit of work for polling network interface 212 (step 410), for checking the CRM queue (step 412), for checking user interface 214 for interaction (step 414) and for checking the database queue (step 416). Preemptive processing is discussed in co-pending U.S. Patent Application titled, "Method and Apparatus for Simulating Multi-Tasking," Ser. No. 08/987,229, by John V. McLain, Jr., incorporated herein by reference in its entirety.

Cooperative processing module 1516 includes instructions for processing an integral number of logical units of work for each task that system manager 127 is expected to process. For example, module 1516 can include instructions for processing a number n of instructions for a logical unit of work for polling network interface 212 (step 410). Module 1516 can also include instruction for processing a number m of instructions for checking the CRM queue (step 412), etc. Module 1516 can set n and m to any integer value. Module 1516 can even set n equal to m so that an equal number of tasks are performed for polling network interface 212 (step 410) and for checking the CRM queue (step 412). Module 1516 can set n and m at initialization or can set them dynamically, according to system loads or any other factors.

In operation, a hybrid preemptive and cooperative multitasking system 1512 jumps between threads, permitting each thread to execute instructions up to a logical stopping point. In one hybrid preemptive and cooperative multi-tasking system, a number of logical units of work or logical stopping points are allotted to each thread. Thus, instead of preempting a thread after just a single logical unit of work is complete, the thread is allowed to complete a number of logical units of work.

For example, a first thread can be executing a script that includes multiple equations. A second thread can be outputting data to a screen display. A hybrid preemptive/cooperative multi-tasking system might permit each thread a number n of logical units of work.

For the first thread, a logical unit of work can be defined as execution of the necessary machine instructions for calculating one equation. Thus, n logical units of work corresponds to calculation of n equations.

For the second thread, a logical unit of work can be defined as a portion of a screen display output, say, for example, one line of a screen display. Thus, n logical units of work corresponds to n lines of screen display. In this example, therefore, a hybrid preemptive and cooperative multi-tasking system that performs n logical units of work per thread, will calculate n equations for the first thread followed by outputting n lines of display data to a screen display. Thereafter, an additional n calculations will be performed for the first thread, followed by another n lines of display data to the screen display.

In one embodiment, hybrid preemptive and cooperative multi-tasking system 1512 dynamically sets the number of logical units of work performed for each thread. In the example above, for instance, the first thread can be allotted n logical units of work while the second thread is allotted m logical units of work. Hybrid preemptive and cooperative multi-tasking system manager 127 dynamically sets n to five and m to twenty, five equations will be calculated for the first thread followed by outputting of twenty lines of screen display data to the screen display.

Regardless of whether the hybrid system performs a single number n of logical units of work for all threads, or dynamically assigns a different number of logical units of work according to the type of thread, hybrid system manager 127 can be tailored according to the types of tasks performed by the computer system.

Hybrid preemptive and cooperative multitasking system manager 127 permits designers to take advantage of human perception. For example, a hybrid preemptive and cooperative multitasking system manager 127 can be tailored to steal screen display time without any human-perceptible delay. A typical screen display update can take approximately one hundred milliseconds. Hybrid system manager 127 can be tailored to steal, for example, five milliseconds of time between, every ten lines of screen display data on a fifty line monitor. The five milliseconds of time can be used by system manager 127 for processing other tasks. A five millisecond interruption to a screen display, although imperceptible to humans, can be used to accomplish significant amounts of processing tasks for other threads. In a network emulation environment, five milliseconds can be used to process communications to and from emulated devices.

Hybrid preemptive and cooperative multitasking system manager 127 permits designers to take advantage of mechanical delays as well. For example, a print job to a printer device and process a script of instructions. Since typical printers include a print buffer for locally storing data for printing, system manager 127 can be tailored to output enough print data to prevent the print buffer from emptying while intermittently interrupting printer outputting for processing the script processing. While system manager 127 processes the script, the printer continues to print data stored in its buffer. The number of logical stopping points assigned to each task is preferably set to a level where, when processing returns to the printer, the printer is just exhausting the data in its buffer. When hybrid preemptive and cooperative multi-tasking system manager 127 is combined with CCVs, the result is a very powerful, memory and CPU cycle conserving processing system.

In TND emulator 126, hybrid preemptive and cooperative multi-tasking system manager 127 uses CCVs to switch between processing tasks for network interface 212, user interface 214, database manager 220 and command response manager 216. Details of this multi-tasking are provided below. In one embodiment, the hybrid preemptive and cooperative multi-tasking system is a software module that works in conjunction with an existing operating system. In an alternative embodiment, the hybrid preemptive and cooperative multi-tasking system is implemented as an integral part of an operating system.

G. Computer Program Products

Figure 16:
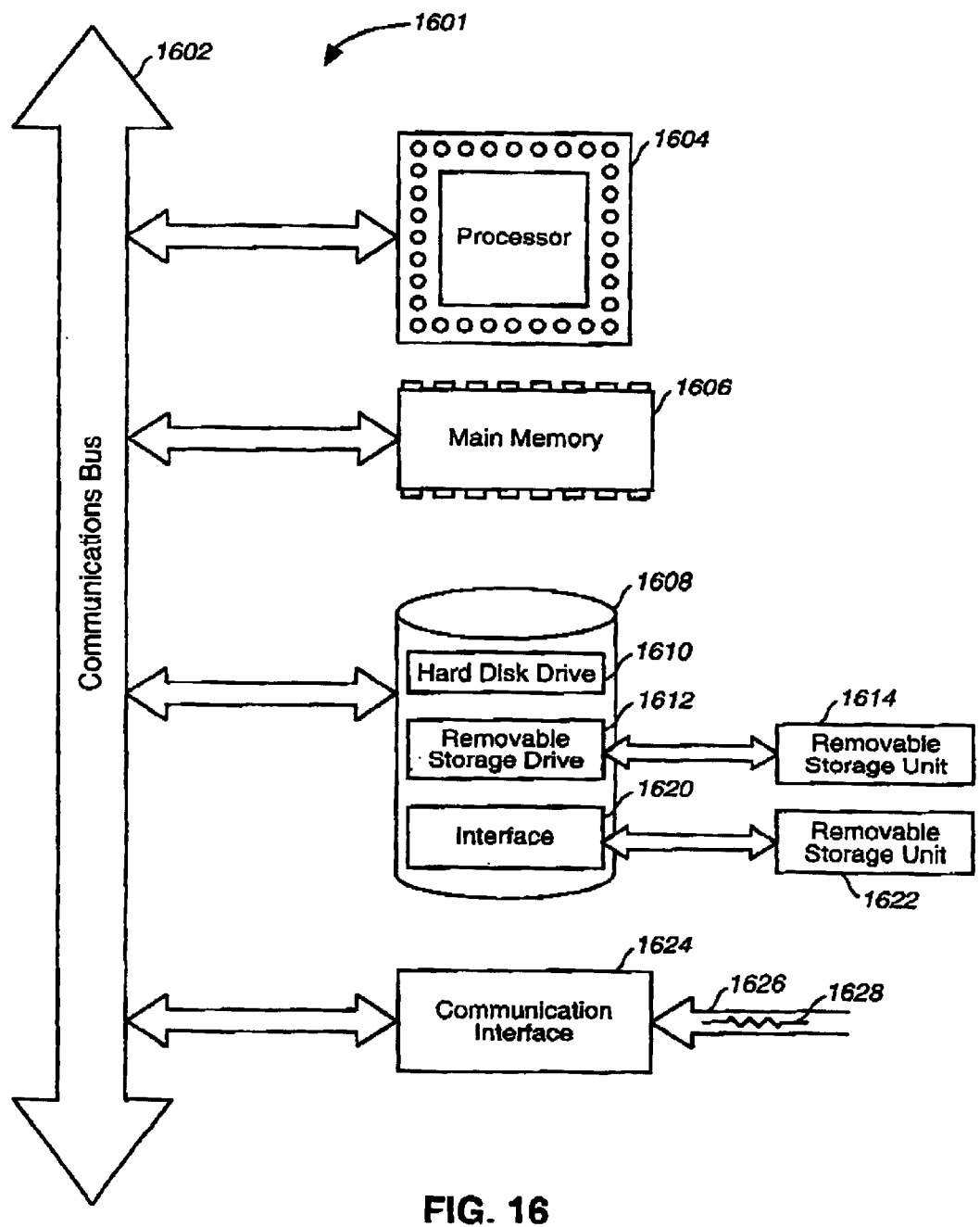
FIG. 16 is a block diagram of a computer system on which the present invention can be implemented.

The present invention can be implemented using hardware, software or a combination thereof and can be implemented in a computer system or other processing system. Referring to FIG. 16, a block diagram illustrates a computer system that can be used to implement the present invention. Various software embodiments are described in terms of this example computer system. After reading this description, it will be apparent to a person skilled in the relevant art how to implement the invention using other computer systems and/or computer architectures.

In FIG. 16, a computer system 1601 includes one or more processors, such as processor 1604. Processor 1604 is connected to a communication bus 1602. Computer system 1601 includes a main memory 1606, preferably random access memory (RAM), and can also include a secondary memory 1608. Secondary memory 1608 can include, for example, a hard disk drive 1610 and/or a removable storage drive 1612, representing a floppy disk drive, a magnetic tape drive, an optical disk drive, etc. Removable storage drive 1612 reads from and/or writes to a removable storage unit 1614 in a well known manner. Removable storage unit 1614, represents a floppy disk, magnetic tape, optical disk, etc. which is read by and written to by removable storage drive 1612. Removable storage unit 1614 includes a computer usable storage medium having stored therein computer software and/or data.

In alternative embodiments, secondary memory 1608 can include other similar means for allowing computer programs or other instructions to be loaded into computer system 1601. Such means can include, for example, a removable storage unit 1622 and an interface 1620. Examples of such can include a program cartridge and cartridge interface (such as that found in video game devices), a removable memory chip (such as an EPROM, or PROM) and associated socket, and other removable storage units 1622 and interfaces 1620 which allow software and data to be transferred from the removable storage unit 1622 to computer system 1601.

Computer system 1601 can also include a communications interface 1624. Communications interface 1624 allows software and data to be transferred between computer system 1601 and external devices. Examples of communications interface 1624 include, but are not limited to a modem, a network interface (such as an Ethernet card), a communications port, a PCMCIA slot and card, etc. Software and data transferred via communications interface 1624 are in the form of signals which can be electronic, electromagnetic, optical or other signals capable of being received by communications interface 1624. These signals 1626 are provided to communications interface via a channel 1628. Channel 1628 carries signals 1626 and can be implemented using wire or cable, fiber optics, a phone line, a cellular phone link, an RF link and other communications channels.

In this document, the terms "computer program medium" and "computer usable medium" are used to generally refer to media such as removable storage device 1612, a hard disk installed in hard disk drive 1610, and signals 1626. Computer program products are means for providing software to computer system 1601.

Computer programs (also called computer control logic) are stored in main memory and/or secondary memory 1608. Computer programs can also be received via communications interface 1624. Such computer programs, when executed, enable the computer system 1601 to perform the features of the present invention as discussed herein. In particular, the computer programs, when executed, enable the processor 1604 to perform the features of the present invention. Accordingly, such computer programs represent controllers of the computer system 1601.

In an embodiment where the invention is implemented using software, the software can be stored in a computer program product and loaded into computer system 1601 using removable storage drive 1612, hard drive 1610 or communications interface 1624. The control logic (software), when executed by the processor 1604, causes the processor 1604 to perform the functions of the invention as described herein.

In another embodiment, the invention is implemented primarily in hardware using, for example, hardware components such as application specific integrated circuits (ASICs). Implementation of the hardware state machine so as to perform the functions described herein will be apparent to persons skilled in the relevant art(s).

In yet another embodiment, the invention is implemented using a combination of both hardware and software.

III. Method of Network Emulation

Figure 3:
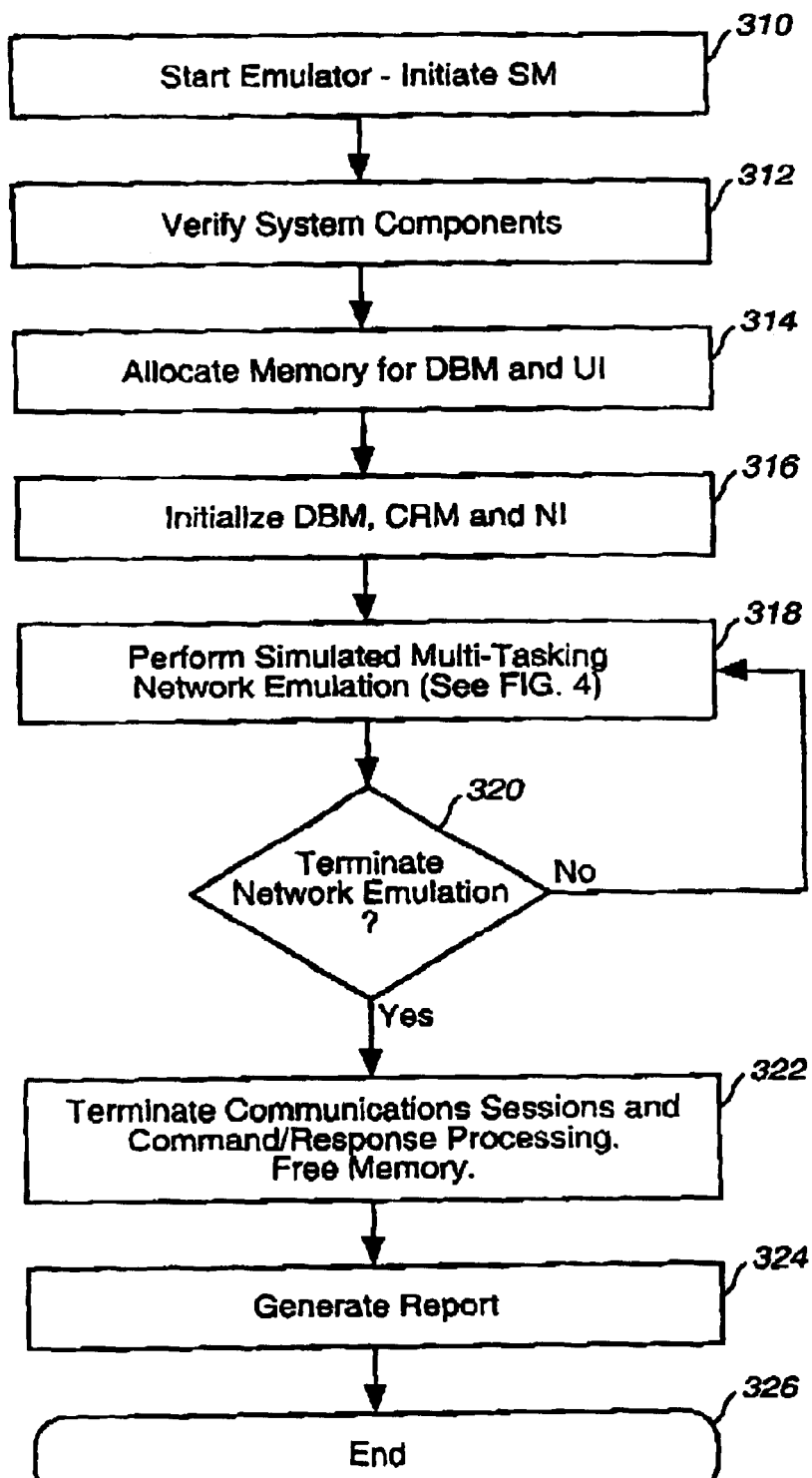
FIG. 3 is a process flowchart illustrating the process performed by a hybrid preemptive and cooperative multi-tasking system manager.

A method for emulating a telecommunications network is now provided. The method is described as implemented by the logical components identified in FIGS. 1 and 2. Referring to the process flowchart of FIG. 3, the process begins at step 310, where TND emulator 126 is started, initiating system manager 127.

In step 312, system manager 127 verifies system components, such as the computer's memory, mouse, display, and disk storage.

In step 314, system manager 127 allocates the computer's memory for database manager 220 and user interface 214.

In step 316, system manager 127 initializes database manager 220, command response manager 216 and network interface 212. Upon initialization, command response manager 216 preferably allocates a predetermined number of CCVs 910 for handling anticipated communications sessions. Alternatively, CCVs 910 can be generated dynamically as each command is received by TND emulator 126.

Figure 4:
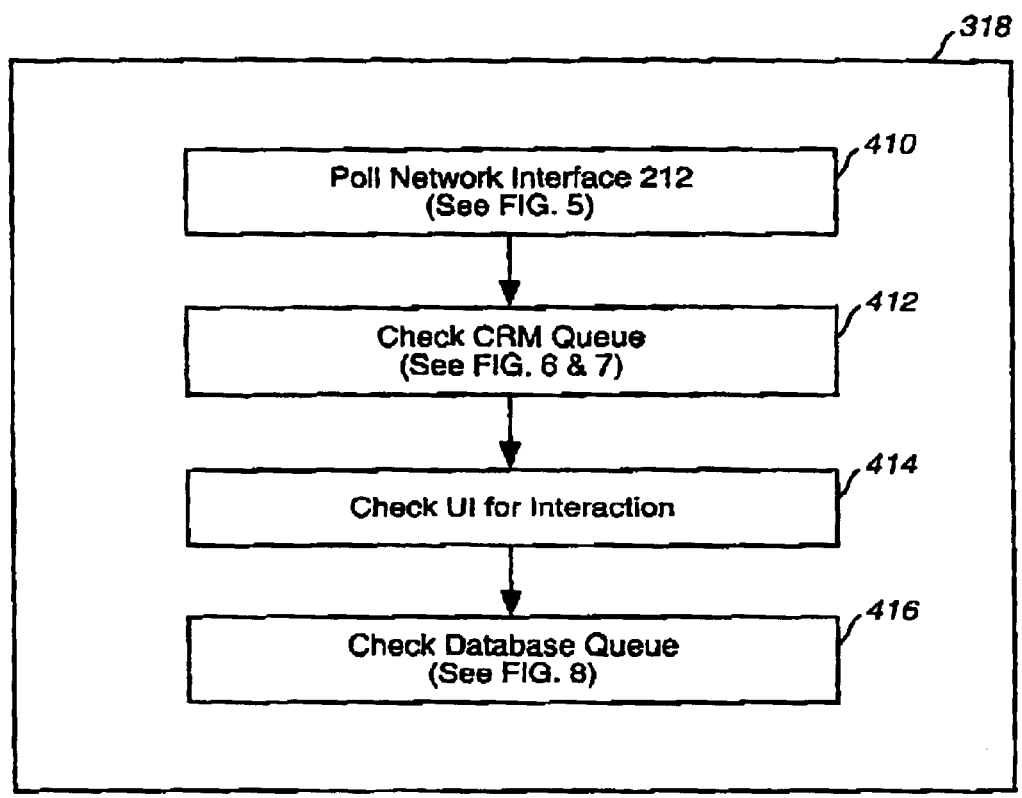
FIG. 4 is a process flowchart illustrating a set of four preferred tasks performed by multi-tasking system manager.

In step 318, hybrid, preemptive and cooperative multi-tasking controller is initiated for carrying out various processes. The hybrid, preemptive and cooperative multi-tasking controller can be part of system manager 127. The multi-tasking controller selectively passes control of system processing from one task to another so that the processes appear to be performed in parallel. In FIG. 4, these tasks are shown as steps 410–416. Steps 410–416 are executed in a tightly controlled loop. At any time, the user or the control system can opt to terminate processing, as indicated in step 320.

Referring to FIG. 4, system manager 127 polls network interface 212 by checking its queue for inbound and outbound messages. Inbound messages are received from control system 116 and passed on to command response manager 216. If any outbound messages are found, system manager 127 invokes network interface 212, which sends the messages to control system 110 as illustrated in FIG. 5.

Figure 5:
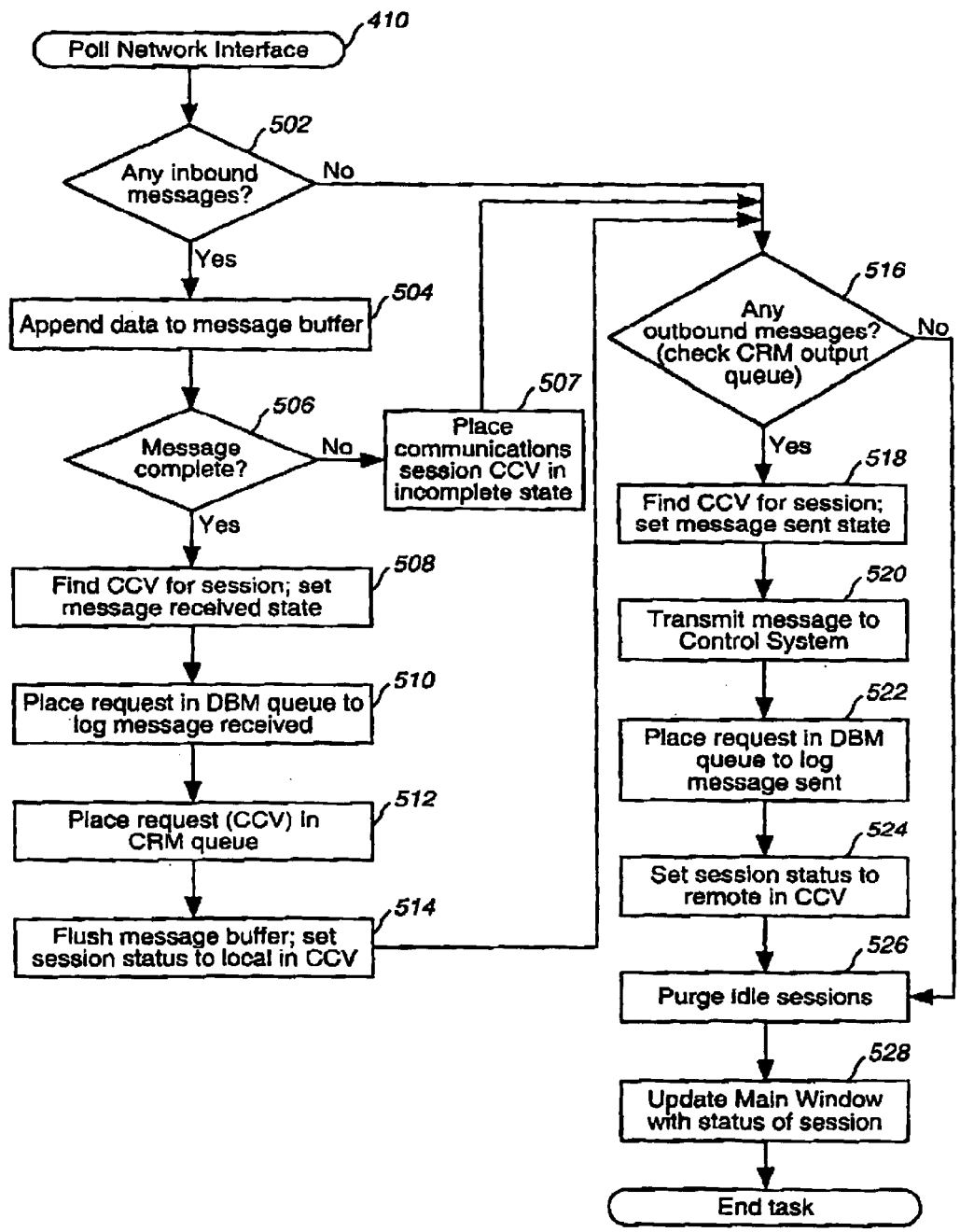
FIG. 5 is a process flowchart illustrating the process performed by the network interface of FIG. 2.

Referring to FIG. 5, the process performed by network interface 212 is illustrated. This is a detailed breakout of the process performed in step 410.

TND emulator 126 supports multiple communications sessions with control system 116. While processing a received message, TND emulator 126 can receive another message and begin processing it as well.

In step 502, system manager 127 determines whether any inbound messages have been received. If no message is detected, processing jumps to step 516. If a message is detected, processing proceeds to step 504.

Network interface 212 can receive messages in data packets. A message can thus require several reads before it is completed. In step 504, network interface 212 stores these message packets in a memory buffer and continuously appends the data there until reception is complete.

In step 506, network interface 212 determines whether the message is complete. If not, processing proceeds to step 507, where network interface 212 places the command control vector in an incomplete state. Processing then jumps to step 516 for processing of outbound messages. Step 516 is described below.

In step 506, if the message is complete, processing proceeds to step 508, where network interface 212 sets the command control vector for the session to a "message received" state. The command control vector contains a pointer to the memory buffer that contains the inbound message.

In step 510, the received message is sent to database manager 220 to be logged in a log file that is part of log database files 228. A request to log the message is placed in queue for database manager 220. System manager 127 checks this queue for such requests in step 416.

In step 512, network interface 212 places the command control vector in the queue of command response manager 216. This is an indication to system manager 127 that an inbound message is pending in command response manager 216.

Later, in step 412, system manager 127 detects this message CCV and invokes command response manager 216. The CCV contains session and protocol information and a pointer to a buffer that stores the received message. As described below with reference to FIG. 6, command response manager 216 can read the request and retrieve the command message from the buffer.

Session status can be maintained in field 924 of command control vector 910, which acts as a simple state engine. Session status identifies a device that is responsible for sending a next message. Session status can be set to "local" or "remote." Local refers to TND emulator 126. Remote refers to a device other than TND emulator 126. In step 514, network interface 212 flushes the message buffer and sets the session status to local, indicating that TND emulator 126 is expected to generate a response to the received message.

In step 516, network interface 212 detects outbound messages. Outbound messages are typically responses formulated by command response manager 216 in response to inbound messages from control system 110. Outbound messages are detected by checking the queue of command response manager 216.

If an outbound message is detected in step 516, then in step 518, network interface 212 locates the associated command control vector for the current session and sets it to "message sent" state.

In step 520, network interface 212 transmits the message to control system 116. The message can be transmitted using a message transfer protocol (MTP) via X.25 network 114. One skilled in the art will recognize that any other suitable protocol can be employed.

In step 522, a request to log this message is placed in queue for database manager 220. In step 416, system manager 127 will check this queue for such requests. The sent message will then be recorded in a log file that is part of log database files 228.

In step 524, after transmitting and logging the sent message, network interface 212 sets the session's status, maintained in the command control vector, to remote.

In step 526, after processing and logging the outbound message, or if no outbound messages were detected in step 516, network interface 212 purges any idle communications sessions.

In step 528, network interface 212 updates a display with the current session status. See FIG. 13 for a typical display screen.

Referring back to FIG. 4, after a predetermined number of logical stopping points are reached in step 410, the multi-tasking controller jumps to step 412. In step 412, system manager 127 checks a queue of command response manager 216 for inbound messages placed by network interface 212. These messages represent commands from control system 110. One or more of these messages can require a response. Recall that network interface 212 sets an indicator in a command control vector for each received command and places the command control vector in the queue of command response manager. The command control vector contains a pointer to the memory buffer that contains the inbound message. If any messages are in the queue, system manager 127 invokes command response manager 216, which performs the process illustrated in FIG. 6. The command response manager process of FIG. 6 can invoke a script interpreter processes, illustrated in FIG. 7 and discussed below.

Figure 6:
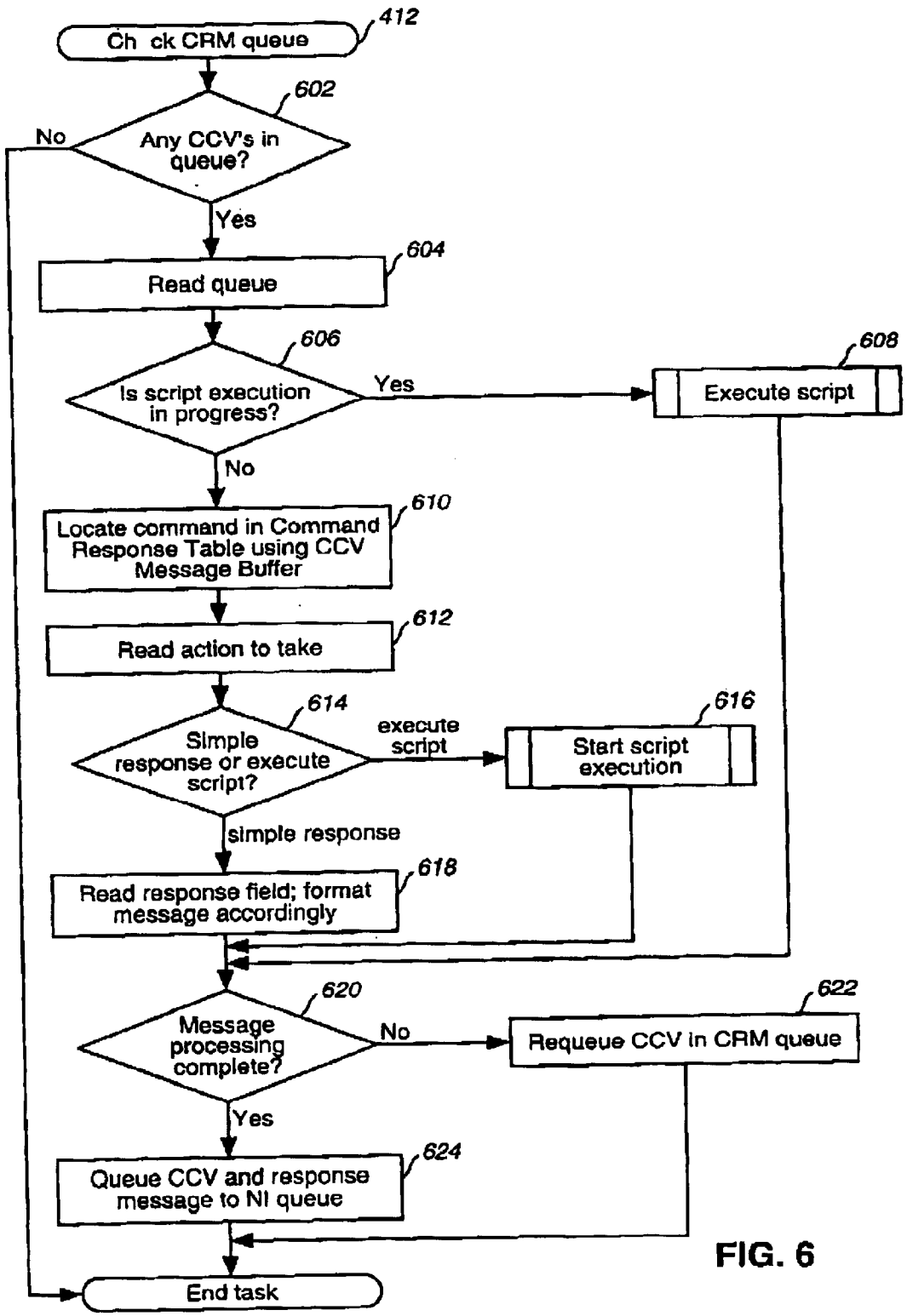
FIG. 6 is a process flowchart illustrating the process performed by the command response manager of FIG. 2.

Referring to FIG. 6, a process flowchart illustrates the process performed by command response manager 216. System manager 127 invokes command response manager 216 when system manager 127 detects a request to process in inbound message in the queue of command response manager 216. The process is based on status information in the command control vector. The command control vector contains pointers to a command response table.

In step 602, command response manager 216 is invoked if any command control vectors are detected in its queue by system manager 127.

In step 604, command response manager 216 finds and reads the command control vector in its queue.

In step 606, command response manager 216 determines whether a script is currently executing. A script can be executing for the current CCV or a different CCV. If a script is currently executing, it is typically in a hold state at the end of a logical unit of work. If a script is currently executing, processing of the script resumes in step 608.

Figure 7:
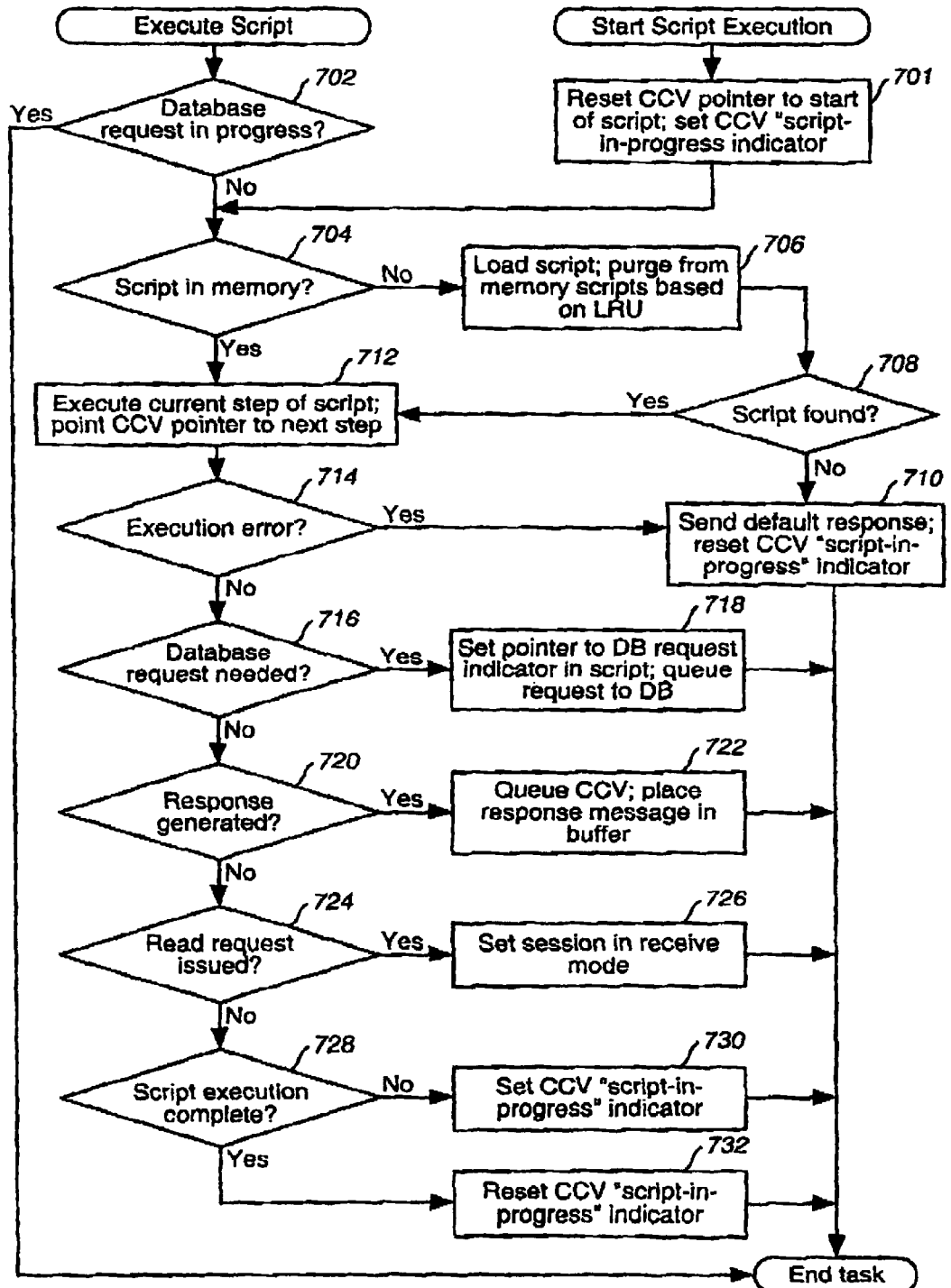
FIG. 7 is a process flowchart illustrating the process performed by the script interpreter of FIG. 2.

In step 608, script interpreter 218 receives control to execute a script. This process is illustrated in FIG. 7 and described more fully below.

If no script is currently executing, then in step 610, command response manager 216 finds an appropriate command response table from a pointer in the command control vector. Command response manager 216 employs the command from the inbound message in the message buffer, which is also located from a pointer in the command control vector, to locate the appropriate record in command response tables 222. This record will indicate a certain action to take, based on the command.

In step 612, command response manager 216 reads the action from command response tables 222.

In step 614, a determination is made as to whether the action will be to formulate a first level response, a second level response or execute a script.

If a script is invoked, then in step 616, command response manager 216 invokes script interpreter 218 to execute the script identified in the command response table. This process is illustrated in FIG. 7 and described more fully below.

In step 618, command response manager 216 reads the response field from the record it located in command response table. It formats a response message in accordance with this field.

In step 620, if the hybrid, preemptive and cooperative multi-tasking controller interrupts processing at a logical stopping point, command response manager 216 determines if message processing is complete.

In step 622, if message processing is not complete, command response manager 216 re-queues the command control vector in the queue of command response manager 216. This command control vector will be detected again in step 602 when system manager 127 returns to step 412 so that and processing for this message will continue until it is complete.

In step 624, when message processing is complete, the command control vector is placed in a queue of network interface 212, which contains a pointer to the buffer in which the response message resides. This is an indication to system manager 127 that an outbound message is pending transmission by network interface 212.

Referring to FIG. 7, a process flowchart illustrates the process performed by script interpreter 218. Script interpreter 218 can be invoked by command response manager in step 608 or step 616 of FIG. 6. Script interpreter 218 performs the processing that emulates the intelligence of a network device. In executing a script, it uses data from script database files 230. These files are data tables that reflect actual data tables of network devices, such as routing tables in a switch.

In step 701, if a script is to begin executing from step 616, then the command control vector is handed off to script interpreter 218, which resets a pointer in field 920 of the command control vector to the start of the script. Script interpreter 218 also sets a "script-in-progress" indicator in the command control vector to on.

In step 702, if a script is already executing and control is passed to script interpreter 218 from step 608, system manager 127 first determines if a database request is in progress. If so, the script task ends so that database manager 220 can complete the database request.

In step 704, script interpreter 218 determines whether the script to be executed is in memory. The requested script can already be in memory in order to generate a response for another CCV.

If the script is not in memory, script interpreter 218 loads the script to memory in step 706. Script interpreter 218 can also free up needed memory by purging any scripts in memory based on a least recently used algorithm (LRU). The least recently used algorithm determines, from a time stamp of last activity, those scripts in memory that have been inactive the longest. It purges these, according to the algorithm, until the amount of needed memory is freed for use in processing the current script.

Recall that more than one CCV can point to the same copy of a command response table or script. Thus, there is no need to maintain more than one copy of a command response table or script in memory.

In step 708, script interpreter 218 determines if the current script was found and loaded.

In step 710, if the script is not loaded, script interpreter 218 instructs command response manager 218 to send a default response. Script interpreter 218 then resets the command control vector's "script-in-progress" indicator.

In step 712, if the script was found and loaded, script interpreter executes the current step. The current step is located with the script pointer in field 920 of command control vector 910, which was set at the start of the script in step 701. The pointer is then incremented to the next step. System manager 127 can identify a data segment such as data segment 1116, 1120 or 1122 to store data associated with script execution. The CCV maintains a pointer to an associated data segment in field 922.

In step 714, script interpreter 218 determines if an error occurred during the execution of step 712. If so, script interpreter 218 instructs command response manager 218 to send a default response in step 710.

If no error was detected in step 714, then in step 716, script interpreter 218 determines if a database request is needed.

In step 718, if a database is required, script interpreter 218 sets a pointer to the place in the script of the database request indicator. This pointer is contained in the command control vector. Script interpreter 218 then places the database request in a queue of database manager 220. The task ends and control is returned to system manager 127. When system manager 127 returns control to script interpreter 218 in step 608, script interpreter 218 will continue processing this script.

In step 720, script interpreter 218 determines if a response has been generated by the script.

In step 722, if a response was generated, command response manager 216 places the command control vector in a queue of network interface 212 and places the response message in a buffer. The task ends and control is returned to system manager 127. This can be used as a logical stopping point indicating the end of a logical unit of work. When system manager 127 returns control to script interpreter 218 in step 608, script interpreter 218 will continue processing this script.

In step 724, script interpreter 218 determines if a read request has been issued by the script.

In step 726, if a read request was issued, system manager sets the communications session, via indication in the command control vector, in a receive mode. The task ends and control is returned to system manager 127. This can be used as a logical stopping point indicating the end of a logical unit of work. When system manager 127 returns control to script interpreter 218 in step 608, script interpreter 218 will continue processing this script.

In step 728, script interpreter 218 determines if script execution is complete.

In step 730, if script execution is not complete, script interpreter 218 sets the command control vector's "script-in-progress" to indicate script processing is not complete. The task then ends and control is returned to system manager 127. This can be used as a logical stopping point indicating the end of a logical unit of work. When system manager 127 returns control to script interpreter 218 in step 608, script interpreter 218 will continue processing this script.

In step 732, when script execution is complete, script interpreter 218 resets the command control vector's "script-in-progress." The task ends and control is returned to system manager 127. This can be used as a logical stopping point indicating the end of a logical unit of work. The virtual object script code (e.g., 1118) is only purged when necessary.

Referring back to FIG. 4, after a predetermined number of logical units of work are completed in step 412, the hybrid multi-tasking controller jumps to step 414. In step 414, system manager 127 checks user interface 214 to detect any input by the user. This can involve, for example, checking for keyboard inputs, mouse input, touch-screen inputs, etc. Then, after a predetermined number of logical units of work are completed in step 414, the hybrid multi-tasking controller jumps to step 416.

In step 416, system manager 127 checks a queue of database manager 220 to determine whether any requests have been sent to database manager 220 by any of the other processes. If a request is detected in the database queue, system manager 127 invokes database manager 220 to perform the process illustrated in FIG. 8.

Figure 8:
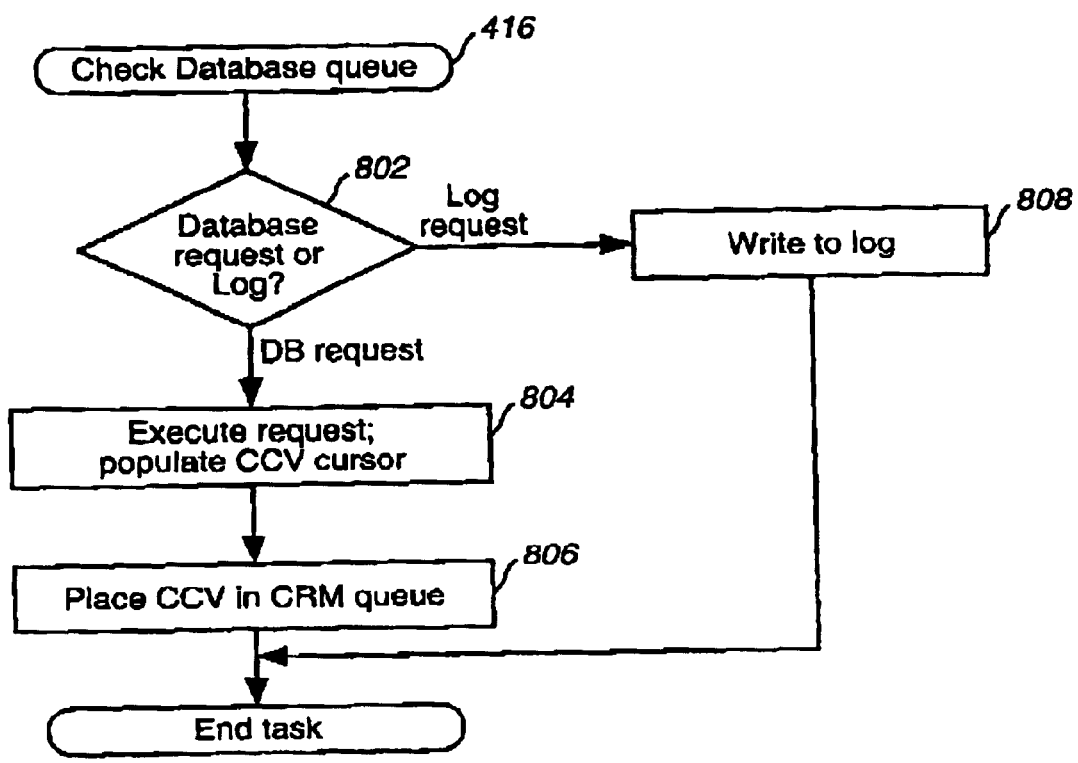
FIG. 8 is a process flowchart illustrating the process performed by the database manager.

Referring to FIG. 8, a process flowchart illustrates the process performed by database manager 220. In step 802, when a database request is detected in step 416, system manager 127 invokes database manager 220 to determine if the request is a database request or a log request.

In step 804, if the request is a database request, database manager 220 executes the request by performing the appropriate database management function, such as retrieve or modify data. Database manager 220 uses an area of memory as a cursor and performs the work in this cursor. Database manager 220 populates the command control vector with a pointer to the cursor.

In step 806, database manager 220 places the command control vector in the queue of command response manager 216, indicating that the request has been completed.

In step 808, if the request is a log request, database manager 220 retrieves the message from a buffer and writes it to the appropriate log in log database files 228.

Referring back to FIG. 3, if in step 320, if a user opts to terminate processing then, in step 322, system manager 127 terminates all communications sessions and processes that are currently executing under control of command response manager 216. System manager 127 also frees up memory used by buffers, queues, and command control vectors. In step 324, TND emulator 126 creates a report of statistics on the processing it has just performed.

IV. Conclusions

The present invention has been described above with the aid of functional building blocks illustrating the performance of specified functions and relationships thereof. The boundaries of these functional building blocks have been arbitrarily defined herein for the convenience of the description. Alternate boundaries can be defined so long as the specified functions and relationships thereof are appropriately performed. Any such alternate boundaries are thus within the scope and spirit of the claimed invention. One skilled in the art will recognize that these functional building blocks can be implemented by discrete components, application specific integrated circuits, processors executing appropriate software and the like or any combination thereof.

While various embodiments of the present invention have been described above, it should be understood that they have been presented by way of example only, and not limitation. Thus, the breadth and scope of the present invention should not be limited by any of the above-described exemplary embodiments, but should be defined only in accordance with the following claims and their equivalents.

What is claimed is:

1. A method for managing computer system resources, comprising:
  generating a first command control vector for a first input message, the first command control vector identifying a method object that contains one or more instructions for processing the first input message, wherein the generating a first command control vector comprises:
    identifying the method object in the first command control vector, and
    identifying, in the first command control vector, a first current instruction of the method object, wherein the first current instruction is used to process the first input message;
  generating a second command control vector associated with a second input message, the second command control vector identifying the same method object identified by the first command control vector, the method object containing one or more instructions for processing the second input message, wherein the generating a second command control vector comprises:
    identifying the same method object in the second command control vector; and
    identifying, in the second command control vector, a second current instruction of the method object, wherein the second current instruction is used to process the second input message;
  providing a single copy of the method object for the first and second command control vectors; and
  processing the first and second input messages using the single copy of the method object.

2. The method according to claim 1, wherein the generating a first command control vector further comprises:
  identifying, in the first command control vector, a communication link from which the first input message is received; and
  identifying, in the first command control vector, a destination device for which the first input message is intended.

3. The method according to claim 2, wherein the generating a second command control vector further comprises:
  identifying, in the second command control vector, a communication link from which the second input message is received; and
  identifying, in the second command control vector, a destination device for which the second input message is intended.

4. The method of claim 3, wherein the first and second current instructions are the same instruction and the same instruction invokes a script, wherein the processing the first and second input messages comprises:
  using a single copy of a script to process the first and second input messages.

5. The method of claim 4, wherein the using a single copy of the script comprises:
  identifying current script instructions in the first and second command control vectors for processing the first and second input messages, respectively;
  storing, in a first data object, data that is generated during execution of the script for the first command control vector; and
  storing, in a second data object, data that is generated during execution of the script for the second command control vector.

6. The method according to claim 1, wherein the processing the first and second input messages comprises:
  processing a number n of logical units of instructions for the first command control vector;
  interrupting processing of the first command control vector; and
  processing a number m of logical units of instructions for the second command control vector.

7. A computer program product for permitting a computer system to manage computer system resources, said computer program product comprising:
  a computer usable medium having computer readable program code means embodied in said medium for causing an application program to execute on the computer system, said computer readable program code means comprising:
    a computer readable first program code means for causing the computer system to generate a first command control vector for a first input message, the first command control vector identifying a method object that contains one or more instructions for processing the first input message, the first program code means further causing the computer system to identify a first current instruction of the method object and use the first current instruction to process the first input message;
    a computer readable second program code means for causing the computer system to generate a second command control vector associated with a second input message, the second command control vector identifying the same method object identified by the first command control vector, the method object containing one or more instructions for processing the second input message, the second program code means further causing the computer system to identify a second current instruction of the method object and use the second current instruction to process the second input message; and a computer readable third program code means for causing the computer system to process the first and second input messages using a single copy of the method object.

8. A system for managing computer system resources, comprising:
  means for generating a first command control vector for a first input message, the first command control vector identifying a method object that contains one or more instructions for processing the first input message;
  means for generating a second command control vector associated with a second input message, the second command control vector identifying the same method object identified by the first command control vector, the method object containing one or more instructions for processing the second input message;
  means for providing a single copy of the method object for the first and second command control vectors; and
  means for processing the first and second input messages using the single copy of the method object.

9. The system according to claim 8, wherein the means for generating a first command control vector for a first input message further comprises:
  means for identifying, in the first command control vector, a communication link from which the first input message is received;
  means for identifying, in the first command control vector, a destination device for which the first input message is intended;
  means for identifying the method object in the first command control vector; and
  means for identifying, in the first command control vector, a first current instruction of the method object, wherein the first current instruction is used to process the first input message.

10. The system according to claim 8, wherein the means for generating a second command control vector associated with a second input message further comprises:
  means for identifying, in the second command control vector, a communication link from which the second input message is received;
  means for identifying, in the second command control vector, a destination device for which the second input message is intended;
  means for identifying the same method object in the second command control vector; and
  means for identifying, in the second command control vector, a second current instruction of the method object, wherein the second current instruction is used to process the second input message.

11. The system of claim 10, wherein the first and second current instructions are the same instruction and the same instruction invokes a script, wherein the means for processing the first and second input messages using the single copy of the method object further comprises:
  means for using a single copy of a script to process the first and second input messages.

* * * * *